(12) United States Patent
Kotake et al.

(10) Patent No.: US 11,400,455 B2
(45) Date of Patent: Aug. 2, 2022

(54) SAMPLE MEASURING SYSTEM AND SAMPLE MEASURING METHOD

(71) Applicant: SYSMEX CORPORATION, Kobe (JP)

(72) Inventors: Hiroki Kotake, Kobe (JP); Kenji Yoshimura, Kobe (JP); Yuji Watanabe, Kobe (JP); Masaki Shiba, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 298 days.

(21) Appl. No.: 16/261,286

(22) Filed: Jan. 29, 2019

(65) Prior Publication Data

US 2019/0232296 A1 Aug. 1, 2019

(30) Foreign Application Priority Data

Jan. 31, 2018 (JP) .............................. JP2018-015867

(51) Int. Cl.
*B01L 9/00* (2006.01)
*G01N 35/00* (2006.01)
(Continued)

(52) U.S. Cl.
CPC ................ *B01L 9/543* (2013.01); *B01L 1/50* (2013.01); *G01N 35/00* (2013.01);
(Continued)

(58) Field of Classification Search
None
See application file for complete search history.

(56) References Cited

U.S. PATENT DOCUMENTS

| | | | | |
|---|---|---|---|---|
| 4,339,699 A | * | 7/1982 | de Jonge | G01N 35/00 318/561 |
| 4,478,094 A | * | 10/1984 | Salomaa | G01N 35/1065 73/863.32 |

(Continued)

FOREIGN PATENT DOCUMENTS

| | | |
|---|---|---|
| JP | S64-20450 A | 1/1989 |
| JP | H6-300755 A | 10/1994 |

(Continued)

OTHER PUBLICATIONS

English translation of JP 2005-098960A (Year: 2005).*

(Continued)

*Primary Examiner* — Matthew D Krcha
(74) *Attorney, Agent, or Firm* — Crowell & Moring LLP

(57) ABSTRACT

A sample measuring system to reduce waste generated in a plurality of measurement units to be discarded to a common disposal unit while suppressing interference between measurement units due to waste disposal is provided. The sample measuring system includes a first measurement unit and a second measurement unit for measuring a sample, and a common disposal unit for storing waste generated from the first measurement unit and the second measurement unit. The first measurement unit includes a first disposal port connected to the disposal unit for discharging the waste generated in the first measurement unit. The second measurement unit includes a second disposal port connected to the disposal unit for discharging the waste generated in the second measurement unit.

24 Claims, 24 Drawing Sheets

(51) Int. Cl.
  *B01L 1/00* (2006.01)
  *G01N 35/10* (2006.01)
  *G01N 35/02* (2006.01)

(52) U.S. Cl.
  CPC .... *B01L 2300/0627* (2013.01); *G01N 35/025* (2013.01); *G01N 2035/00277* (2013.01); *G01N 2035/00306* (2013.01); *G01N 2035/103* (2013.01)

(56) References Cited

U.S. PATENT DOCUMENTS

| | | | |
|---|---|---|---|
| 5,580,526 | A | 12/1996 | Okayama et al. |
| 5,985,215 | A | 11/1999 | Sakazume et al. |
| 2005/0042138 | A1 | 2/2005 | Ueda et al. |
| 2006/0204997 | A1* | 9/2006 | Macioszek ......... G01N 35/0099 435/6.11 |
| 2015/0226759 | A1* | 8/2015 | Connolly ............. G01N 35/025 435/287.3 |

FOREIGN PATENT DOCUMENTS

| | | | |
|---|---|---|---|
| JP | 2001-13151 | A | 1/2001 |
| JP | 2005-98960 | A | 4/2005 |
| JP | 2005098960 | A * | 4/2005 |
| JP | 2007-17211 | A | 1/2007 |
| JP | 2008-51607 | A | 3/2008 |
| JP | 2008051607 | A * | 3/2008 |
| JP | 2015-75343 | A | 4/2015 |
| JP | 2017-96895 | A | 6/2017 |

OTHER PUBLICATIONS

The extended European search report dated Jun. 28, 2019 in a counterpart European application No. 19154444.4.

The Japanese Office Action dated Oct. 26, 2021 in a counterpart Japanese patent application No. 2018-015867.

Communication pursuant to Article 94(3) EPC dated Feb. 11, 2022 in a counterpart European patent application No. 19154444.4.

* cited by examiner

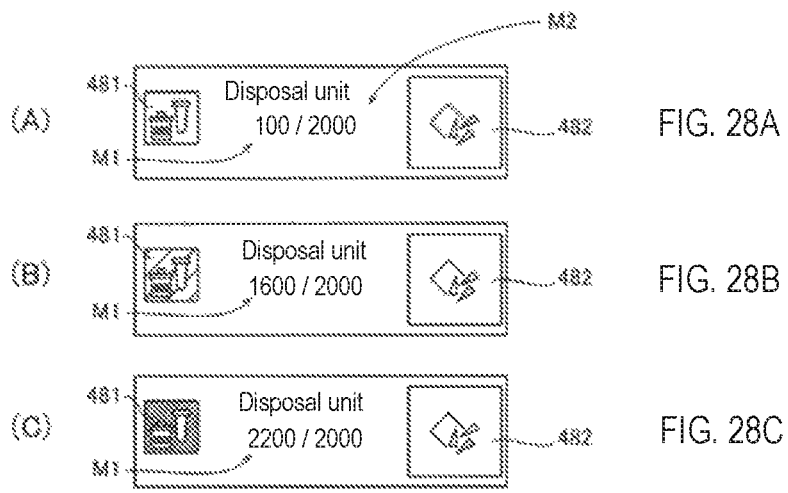
FIG. 28A
FIG. 28B
FIG. 28C
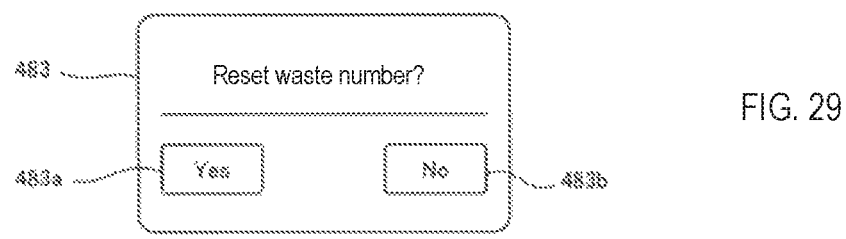
FIG. 29

SAMPLE MEASURING SYSTEM AND SAMPLE MEASURING METHOD

RELATED APPLICATIONS

This application claims priority from prior Japanese Patent Application No. 2018-015867, filed on Jan. 31, 2018, entitled "Sample Measuring System and Sample Measuring Method", the entire contents of which are incorporated herein by reference.

BACKGROUND OF THE INVENTION

1. Field of the Invention

The present invention relates to a sample measuring system and sample measuring method.

2. Description of the Related Art

Conventionally, sample measuring systems are known (see, for example, Japanese Patent Application Publication No. 2017-096895).

As shown in FIG. 36, Japanese Patent Application Publication No. 2017-096895 discloses a sample analyzer 900 (sample measuring system) including two detection units 901 and 902 (first measurement unit and second measurement unit) that perform measurement of a sample accommodated in a reaction container, and a disposal unit 903 for accommodating reaction containers that have been used in measurement by each detection unit as waste. The detection unit 901 is provided in an area 904a on the upper surface of a measurement unit 904 that suctions a sample from a sample container, mixes reagents with the suctioned sample, and performs measurement. The detection unit 902 is provided in an area 905 adjacent to the side surface of the measurement unit 904. The measurement unit 904 is provided with two disposal ports 906, 907. Both of the two disposal ports 906 and 907 are provided in the area 904a where the detection unit 901 is installed, and are not provided in the area 905 where the detection unit 902 is installed. In the above Japanese Patent Application Publication No. 2017-096895, a reaction container that has been used in measurement by the detection unit 901 is put into the disposal port 906 and transferred to the disposal unit 903, and a reaction container that has been used in measurement by the detection unit 902 is put into the disposal port 907 and transferred to the unit 903.

However, in the sample analyzer 900 described in Japanese Patent Application Publication No. 2017-096895, since two disposal ports 906, 907 are provided in the area 904a where the detection unit 901 is installed, and a disposal port is not provided in the area 905 where the detection unit 902 is installed, it is necessary to transfer the reaction container that has been used for measurement by the detection unit 902 from the area 905 to the disposal port 907 of the area 904a. Therefore, it is not possible for the detection unit 902 side to complete disposal of the reaction container used for measurement within the area 905. Since a large number of units are arranged in the area 904a, it is necessary to avoid interference with each unit in the area 904a when transferring the used reaction container from the area 905 to the area 904a, which complicates the operational control.

On the other hand, although not described in Japanese Patent Application Publication No. 2017-096895, when the disposal unit 903 is provided separately for the detection unit 901 and the detection unit 902, there is no need to transfer the waste from the area 905 to the area 904a, and operational interference can be reduced. However, when the disposal unit 903 is provided separately, the user's work burden when disposing the waste is increased since the user is required to individually dispose of the waste stored in each disposal unit 903.

The present invention is directed to suppressing interference between measurement units due to the disposal of waste while allowing waste generated in a plurality of measurement units to be discarded to a common disposal unit.

SUMMARY OF THE INVENTION

A sample measuring system (100) according to a first aspect of the present invention includes a first measurement unit (10) and a second measurement unit (20) for measuring a sample, and a disposal unit (50) for storing a waste (GB) generated from the first measurement unit (10) and second measurement unit (20), wherein the first measurement unit (10) includes a first disposal port (11) connected to the disposal unit (50) for discharging the waste (GB) generated by the first measurement unit (10), and the second measurement unit (20) includes a second disposal port (21) connected to the disposal unit (50) for discharging the waste generated in the second measurement unit (20).

In the sample measuring system (100) according to the first aspect, the waste (GB) generated in the first measurement unit (10) and the waste (GB) generated in the second measurement unit (20) are discarded (GB) can be discarded to the disposal unit (50) by the above described structure. Since the first measurement unit (10) and the second measurement unit (20) each include a disposal port, the waste (GB) generated in the first measurement unit (10) is discarded to the first disposal port (11) in the first measurement unit (10), and the waste (GB) generated in the second measurement unit (20) is discarded to the second disposal port (21) in the second measurement unit (20). Therefore, it is unnecessary to transfer the waste (GB) from one measurement unit to the other measurement unit, so that it is possible to avoid interference between the measurement units due to the disposal of the waste (GB). As described above, it is possible to discard the waste (GB) generated by a plurality of measurement units in the disposal unit (50), while suppressing interference between measurement units due to discarding of the waste (GB). As a result, it is unnecessary for the user to separately perform the task of disposing of the waste (GB) generated in the first measuring unit (10) and the task of disposing the waste (GB) generated in the second measuring unit (20), and the work burden of the user can be reduced since the waste (GB) of each measurement unit can be disposed of at the same time from the disposal unit (50).

A sample measuring method according to a second aspect of the present invention includes the steps of measuring a sample in a first measurement unit (10), delivering waste (GB) generated in a first measurement unit (10) to a disposal port (11) provided in the first measurement unit (10), measuring a sample in a second measurement unit (20), delivering waste (GB) generated in the second measurement unit (20) to a second disposal port (21 provided in the second measurement unit (20), and storing the waste (GB) discharged from the first disposal port (11) and the waste (GB) discharged from the second disposal port (21) in the shared disposal unit (50) which is connected to the first disposal port (11) and the second disposal port (21).

In the sample measuring method according to the second aspect, the waste (GB) generated in the first measurement unit (10) and the waste (GB) generated in the second measurement unit (20) can be discarded to the shared disposal unit (50). The waste (GB) generated in the first measurement unit (10) can be discarded to the first disposal port (11) in the first measurement unit (10), and the waste (GB) generated in the second measurement unit (20) can be discarded to the second disposal port (21) in the second measurement unit (20). Therefore, it is unnecessary to transfer the waste (GB) from one measurement unit to the other measurement unit, so that it is possible to avoid interference between the measurement units due to the disposal of the waste (GB). As described above, it is possible to discard waste (GB) generated by a plurality of measurement units in the common disposal unit (50), while suppressing interference between measurement units due to discarding of the waste (GB). As a result, it is unnecessary for the user to separately perform the task of disposing of the waste (GB) generated in the first measuring unit (10) and the task of disposing the waste (GB) generated in the second measuring unit (20), and the work burden of the user can be reduced since the waste (GB) of each measurement unit can be disposed of at the same time from the common disposal unit (50).

The present invention is directed to suppressing operational interference between measurement units due to the disposal of waste while allowing waste generated in a plurality of measurement units to be discarded to a common disposal unit.

BRIEF DESCRIPTION OF THE DRAWINGS

FIG. 28A, FIG. 28B, and FIG. 28C are diagrams showing examples of changing the display mode of information relating to the amount of waste;

FIG. 29 is a diagram showing a dialog for resetting the waste count;

DETAILED DESCRIPTION OF THE PREFERRED EMBODIMENTS

Figure 1:
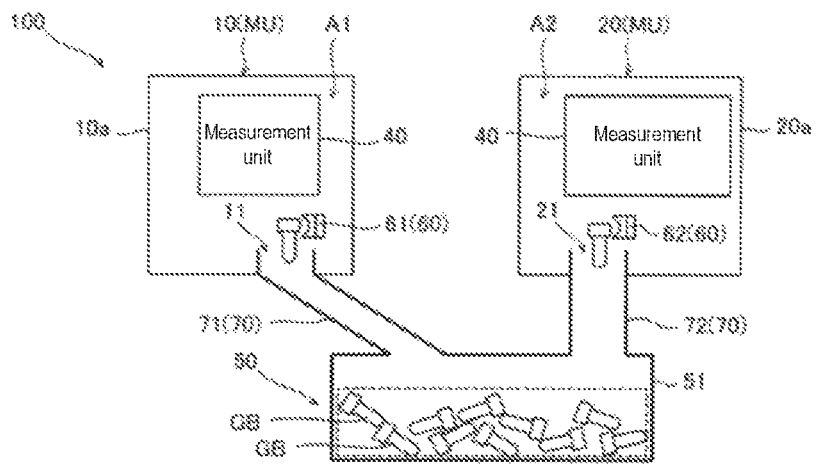
FIG. 1 is a schematic diagram showing an outline of a sample measuring system.

Hereinafter, embodiments will be described with reference to the drawings.

Outline of Sample Measuring System

First, a summary of a sample measuring system 100 according to one embodiment will be described with reference to FIG. 1.

The sample measuring system 100 is a system for measuring a sample containing a target component.

The sample includes a specimen derived from the living body collected from the subject. The specimen contains the component to be measured. The sample may be the specimen itself or may be a sample for measurement prepared by adding a predetermined reagent to the specimen. The subject is mainly a human, but it may be another animal other than a human. The sample measuring system 100 performs measurements for clinical examinations or medical studies of specimens taken from patients, for example. A specimen derived from a living body is a liquid prepared, for example, by subjecting a liquid such as blood (whole blood, serum or plasma), urine, or other body fluid collected from a subject, or a liquid obtained by a predetermined pretreatment of a collected body fluid or blood. The specimen may be, for example, a part of tissue of a subject other than a liquid, a cell, or the like. The sample measuring system 100 detects a predetermined target component contained in the sample. The target component may include, for example, predetermined a component in the blood or urine specimen, cells and tangible components. The target component may be a nucleic acid such as DNA (deoxyribonucleic acid), cells and intracellular substances, antigens or antibodies, proteins, peptides and the like.

The sample measuring system 100 includes a plurality of measurement units MU for measuring samples. The measuring unit MU may be a measuring unit that functions as a single analyzing device such as a blood cell counter, a blood coagulation analyzer, an immunoassay device, a urinary solid component analyzer, or the like. The measuring unit MU does not function as an independent analyzer and may perform a task necessary for measuring the sample by cooperation with other units included in the sample measuring system 100. The measurement unit MU includes a measurement unit 40 for measuring the sample. The measuring unit MU may itself be the measuring unit 40.

The measurement unit 40 is configured to measure the components contained in the sample. Specifically, the measuring unit 40 measures the measurement sample to which the reagent of the reagent container has been added, and measures the component of the sample. The method of measuring the target component by the measuring unit 40 is not limited, and a method corresponding to the target component such as a chemical method, an optical method, an electromagnetism method, or the like can be adopted. The presence or absence of a target component, the number or amount of target component, the concentration and abundance ratio of a target component and the like are analyzed based on the measurement result of the measurement unit 40.

The sample measuring system 100 includes at least a first measurement unit 10 and a second measurement unit 20. The first measurement unit 10 and the second measurement unit 20 each include a measurement unit 40 provided separately. The first measurement unit 10 and the second measurement unit 20 may be units that measure the same measurement item or units that measure different measurement items. The first measurement unit 10 and the second measurement unit 20 may be units that perform measurement according to the same measurement principle or units that perform measurement according to different measurement principles.

The measuring unit MU generates waste GB as the samples are measured. That is, the measurement unit MU performs measurement using a disposable consumable item. Used consumables become waste GB. Therefore, in the sample measuring system 100, waste GB is generated from each of the first measurement unit 10 and the second measurement unit 20. The waste GB occurs, for example, each time a measurement is performed.

The waste GB may include, for example, spent reaction containers used to prepare samples, spent pipette tips used to dispense liquids such as analytes and reagents and the like. The waste GB is collected by the user from the sample measuring system 100 and discarded. When separately storing the waste GB generated in each measuring unit MU, the user has to collect the waste GB individually from each measuring unit MU, which is cumbersome.

Therefore, the sample measuring system 100 includes a shared disposal unit 50 for storing the waste GB generated from the first measurement unit 10 and the second measurement unit 20. The disposal unit 50 has an internal space partitioned from the outside by a wall part 51 or the like, and it is possible to store a certain amount of waste GB. The disposal unit 50 may have a box-like or container-like structure configuring an internal space. The disposal unit 50 also may be provided with a disposal box capable of storing the waste GB in a removable manner.

The first measurement unit 10 includes a first disposal port 11 connected to the disposal unit 50 for discharging the waste GB generated in the first measurement unit 10. The second measurement unit 20 includes a second disposal port 21 connected to the disposal unit 50 for discharging the waste GB generated in the second measurement unit 20. The waste GB generated in the first measurement unit 10 is introduced into the first disposal port 11. The waste GB generated in the second measurement unit 20 is introduced into the second disposal port 21. The waste GB input into the first disposal port 11 and the waste GB input into the second disposal port 21 are sent to the disposal unit 50 via the first disposal port 11 and the second disposal port 21, respectively. As a result, waste GB generated from the first measurement unit 10 and waste GB generated from the second measurement unit 20 are stored in the common disposal unit 50.

The first measuring unit 10 can introduce the generated waste GB into the first disposal port 11. The second measurement unit 20 can introduce the generated waste GB into the second disposal port 21. The introduction of the waste GB into the disposal port is performed, for example, by a waste input unit 60 capable of holding and transporting the waste GB. The waste input unit 60 may be a catcher unit capable of holding and releasing the waste GB. For example, the measurement unit 40 capable of holding a reaction container containing a sample also may be disposed above the disposal port, and the measured reaction container may be dropped directly toward the disposal port.

In the sample measuring system 100, the disposal unit 50 is arranged, for example, at a position lower than the first disposal port 11 and the second disposal port 21. In this case, the waste GB introduced into the first disposal port 11 or the second disposal port 21 can be dropped or slid down to the disposal unit 50 by the action of gravity. Therefore, the waste GB can be easily transported to the disposal unit 50.

The disposal unit 50 may be disposed at a position higher than the first disposal port 11 and the second disposal port 21. In this case, the waste GB introduced into the first disposal port 11 or the second disposal port 21 can be conveyed to the disposal unit 50 by, for example, a belt conveyor, a conveying cart, or the like.

In the sample measuring system 100 of the present embodiment, the waste GB generated in the first measuring unit 10 and the waste GB generated in the second measuring unit 20 are discarded in the common disposal unit 50 by the above configurations. Since the first measurement unit 10 and the second measurement unit 20 each include a disposal port, the waste GB generated in the first measurement unit 10 can be discarded to the first disposal port 11 in the first measurement unit 10, and the waste GB generated in the second measurement unit 20 can be discarded to the second disposal port 21 in the second measurement unit 20. Therefore, it is unnecessary to transfer the waste GB from one measurement unit MU to the other measurement unit MU, and it is possible to avoid operational interference of measurement between the measurement units due to the disposal of the waste GB. As described above, it is possible to discard the waste GB generated by the plurality of measurement units in the common disposal unit 50 while avoiding operational interference between the measurement units due to the disposal of the waste GB. As a result, the user need not separately perform the task of disposing the waste GB generated in the first measuring unit 10 and the task of disposing the waste GB generated in the second measuring unit 20, and the waste GB of each measurement unit can be disposed from the disposal unit 50 at the same time, so that the work burden on the user is reduced.

Sample Measurement Method

Figure 2:
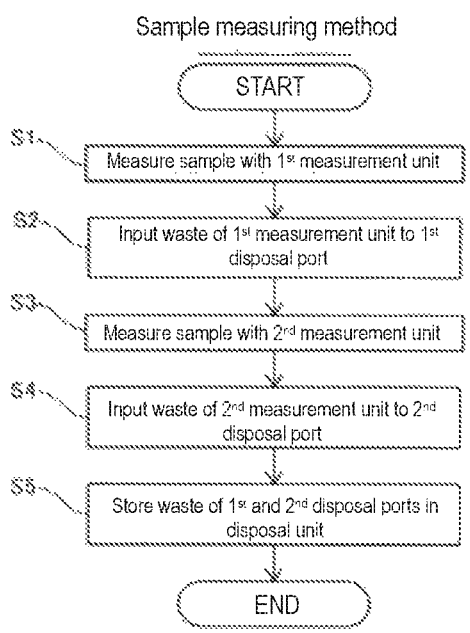
FIG. 2 is a flowchart showing an outline of a sample measuring method.

Next, the sample measuring method of the present embodiment will be described. As shown in FIG. 2, the sample measuring method of the present embodiment includes the following steps S1 to S5. (Step S1) Measure the sample in the first measurement unit 10. (Step S2) Introduce the waste GB generated in the first measurement unit 10 to the first disposal port 11 provided in the first measurement unit 10. (Step S3) Measure the sample in the second measurement unit 20. (Step S4) Introduce the waste GB generated in the second measurement unit 20 to the second disposal port 21 provided in the second measurement unit 20. (Step S5) Store the waste GB discharged from the first disposal port 11 and the waste GB discharged from the second disposal port 21 to the shared disposal unit 50 which is connected to the first disposal port 11 and the second disposal port 21.

Steps S1 and S3 may be performed simultaneously or in parallel, or either of the steps may be performed first. Step S2 is carried out during or after step S1. Step S4 is carried out during or after step S3. As a result of steps S2 and S4, the waste GB generated in the first measurement unit 10 and the waste GB generated in the second measurement unit 20 are stored in a shared common disposal unit 50 in step S5.

According to the sample measuring method of the present embodiment, the waste GB generated in the first measuring unit 10 and the waste GB generated in the second measuring unit 20 are discarded in the common disposal unit 50 by the above steps. The waste GB generated in the first measurement unit 10 can be discarded to the first disposal port 11 in the first measurement unit 10 and the waste matter GB generated in the second measurement unit 20 can be discarded to the second disposal port 21 in the second measurement unit 20. Therefore, it is unnecessary to transfer the waste GB from one measurement unit to the other measurement unit, and operational interference between the measurement units due to the disposal of the waste matter GB can be avoided. As described above, it is possible to discard the waste GB generated by the plurality of measurement units in the common disposal unit 50 while avoiding operational interference between the measurement units due to the disposal of the waste GB. As a result, the user need not separately perform the task of disposing the waste GB generated in the first measuring unit 10 and the task of disposing the waste GB generated in the second measuring unit 20, and the waste GB of each measurement unit can be disposed from the disposal unit 50 at the same time, so that the work burden on the user is reduced.

Waste

The disposal unit 50 receives waste GB including at least one of a reaction container 90 for preparing a sample and a pipette tip 93 for dispensing a sample. In this way the used reaction containers 90 and the pipette tips 93 generated in each of the first measurement unit 10 and the second measurement unit 20 can be discarded together in the common disposal unit 50.

The disposal unit 50 receives the waste GB that has come into contact with the sample. That is, the waste GB received by the disposal unit 50 includes a container containing a sample or a sample containing specimen, and a pipette tip used to suction a sample or a sample containing specimen. Waste GB that comes into contact with such samples will be disposed separately from other waste as infectious biohazard. Therefore, the user can collect the biohazardous waste GB generated in each of the first measurement unit 10 and the second measurement unit 20 collectively in the common disposal unit 50 without separating them. On the other hand, waste such as a reagent container not in contact with the sample is not discarded in the disposal unit 50. Therefore, it is unnecessary for the user to separate infectious waste from other waste.

Figure 3:
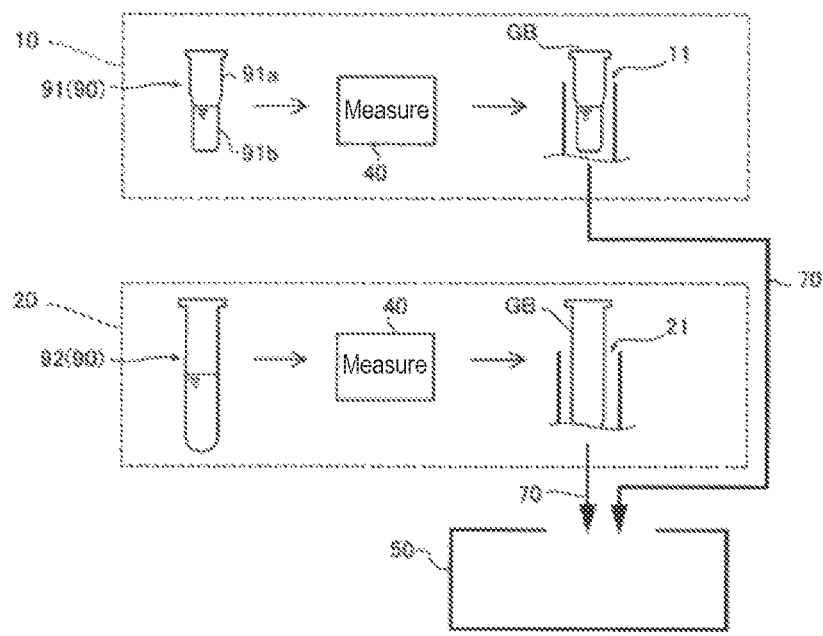
FIG. 3 is a schematic view showing disposal of a reaction container.

In FIG. 3, the disposal unit 50 receives waste GB including a reaction container 90 for preparing a sample. The reaction container 90 contains, for example, a specimen and a reagent. In FIG. 3, the first measurement unit 10 measures the sample contained in the first reaction container 91. The first measurement unit 10 discards the first reaction container 91 that has been measured to the first disposal port 11. The second measurement unit 20 measures the sample contained in the second reaction container 92. The second measurement unit 20 discards the second reaction container 92 that has been measured to the second disposal port 21. In this way the used reaction containers 90 generated in each of the first measurement unit 10 and the second measurement unit 20 can be discarded together in the common disposal unit 50.

The first reaction container 91 and the second reaction container 92 may be formed in the same shape and of the same material. In the example of FIG. 3, at least one of the shape and the material of the first reaction container 91 and the second reaction container 92 is different. The disposal unit 50 receives the waste GB including the first reaction container 91 and the second reaction container 92. In this way, for example, measurement can be performed using the optimum reaction container for each of the first measurement unit 10 and the second measurement unit 20, particularly in the case where the first measurement unit 10 and the second measurement unit 20 perform measurement using different measurement principles. Since the common disposal unit 50 collectively stores various reaction containers having different shapes and materials, the user can dispose of various kinds of waste GB collectively.

Figure 4:
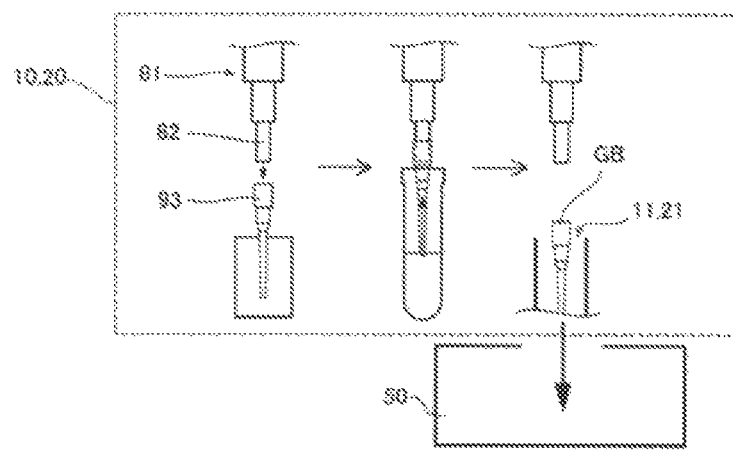
FIG. 4 is a schematic diagram showing disposal of a pipette tip.

In the example of FIG. 4, the disposal unit 50 receives the waste GB including the pipette tip 93 for dispensing the sample. In FIG. 4, at least one of the first measurement unit 10 and the second measurement unit 20 includes a sample dispensing unit 81 for dispensing a sample using a pipette tip 93. The sample dispensing unit 81 includes a nozzle 82 connected to a pressure source (not shown), and the pipette tip 93 can be attached to and detached from the tip of the nozzle 82. The sample dispensing unit 81 can suction the sample into the pipette tip 93 by supplying a negative pressure from the nozzle 82. The sample dispensing unit 81 can dispense the sample suctioned into the pipette tip 93 into the reaction container 90 shown in FIG. 3. After dispensing, the used pipette tip 93 is input into the disposal port.

Waste Transport Unit

As shown in FIG. 1, the sample measuring system 100 is provided with a waste transport unit 70 for transporting the waste GB discharged from at least one of the first disposal port 11 and the second disposal port 21 to the disposal unit 50.

The waste transport unit 70 may transport the waste GB to the disposal unit 50 by the action of gravity or may be configured to transport the waste GB by the power supplied from a drive source.

In this way the waste GB can be transported to the disposal unit 50 by the waste transport unit 70 without arranging the disposal unit 50 at a position immediately below the first disposal port 11 and the second disposal port 21. As a result, the degree of freedom of the installation position of the first disposal port 11, the second disposal port 21, and the disposal unit 50 in the sample measuring system 100 can be improved. Therefore, for example, it is possible to prioritize the process efficiency in each measurement unit by arrangement at a position relative to the first disposal port 11 and the second disposal port 21. It is possible to arrange the disposal unit 50 at a position giving priority to the workability of taking out the waste GB by the user.

The waste transport unit 70 may be provided commonly to the first measurement unit 10 and the second measurement unit 20, or may be provided separately for each of the first measurement unit 10 and the second measurement unit 20.

In the example shown in FIG. 1, for example, the waste transport unit 70 includes a first chute unit 71 that communicates the first disposal port 11 and the disposal unit 50, and a second chute unit 71 that communicates the second disposal port 21 with the disposal unit 50. These chute units are passages for conveying the waste GB by the action of gravity. The chute unit is configured by, for example, a tubular passage extending in the vertical direction, an inclined passage which is inclined downward toward the disposal unit 50, and the like. In the example of FIG. 1, the first chute unit 71 is an inclined passage and the second chute unit 72 is a tubular passage. In this way it is possible to transport the waste GB sliding vertically or obliquely using the action of gravity. As a result, the waste GB can be transported to the disposal unit 50 with a simple structure even when one of the first disposal port 11 and the second disposal port 21 is not arranged directly below the disposal unit 50.

Figure 5:
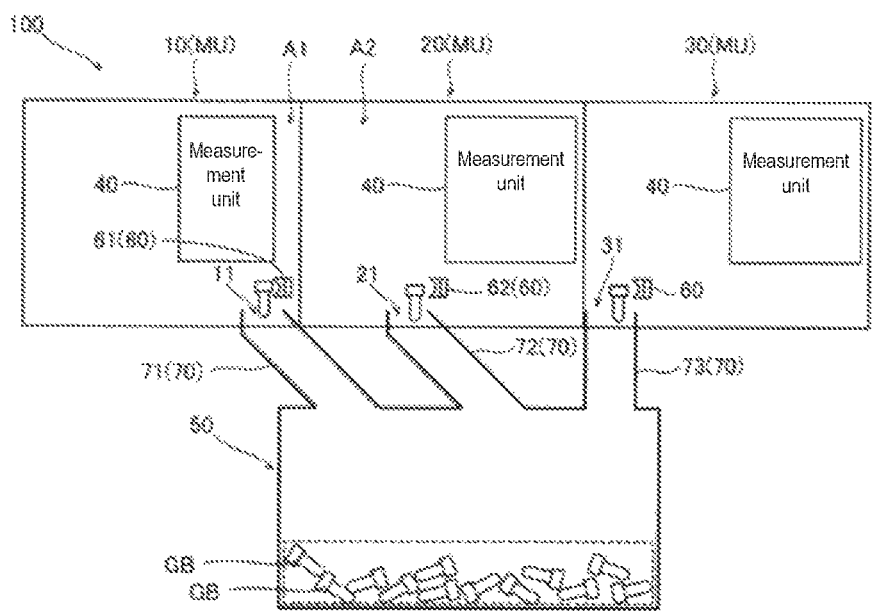
FIG. 5 is a schematic diagram showing a first structural example of a disposal unit and a waste transport unit.

In FIG. 5, the sample measuring system 100 includes three measurement units MU. That is, the sample measuring system 100 includes a first measurement unit 10, a second measurement unit 20, and a third measurement unit 30. In this case, the waste transport unit 70 includes a first chute unit 71 that communicates the first disposal port 11 and the disposal unit 50, a second chute unit 72 that communicates the second disposal port 21 and the disposal unit 50, and a third chute unit 73 that communicates the third waste port 31 of the third measuring unit 30 with the disposal unit 50.

Figure 6:
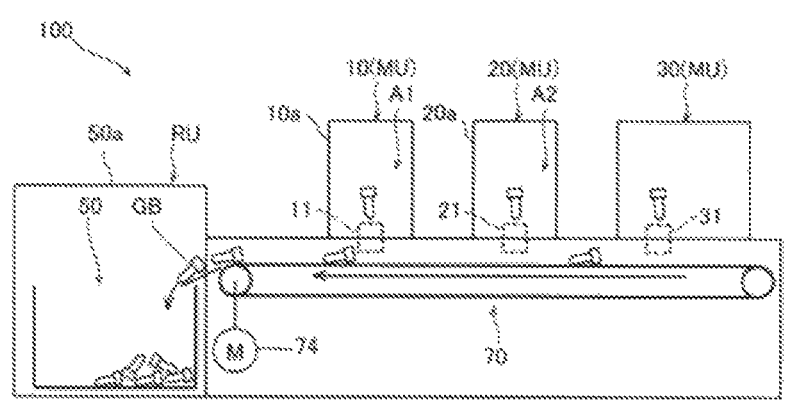
FIG. 6 is a schematic view showing a second structural example of a disposal unit and a waste transport unit.

In the example of FIG. 6, the sample measuring system 100 is provided with a first housing 10a that houses a first measurement unit 10, a second housing 20a that houses a second measurement unit 20, and a third housing 50a that houses a disposal unit 50. Then, the sample measuring system 100 includes a waste transport unit 70 to transport the waste GB discharged from the first disposal port 11 in the first housing 10a and the second disposal port 21 in the second case 20a into the disposal unit 50 of the third housing 50a. In this way it is possible to share the disposal unit 50 by transporting the waste GB generated in each measurement unit MU to the disposal unit 50 by the waste transport unit 70 even when the first measurement unit 10, the second measurement unit 20, and the disposal unit 50 are provided in separate housings. Therefore, it is possible to realize the sample measuring system 100 even in the case of adding additional measuring units in addition to the first measurement unit 10 and the second measurement unit 20, for example, the waste GB discharged from the disposal port of each measurement unit can be discarded to the common disposal unit 50.

Specifically, in FIG. 6, the sample measuring system 100 includes one common waste transport unit 70 for a plurality of measurement units MU. The waste transport unit 70 is configured by a belt conveyor driven by a motor 74. The waste transport unit 70 passes through positions below the first disposal port 11 of the first measurement unit 10, the second disposal port 21 of the second measurement unit 20, and the third disposal port 31 of the third measurement unit 30 so as to be connected to the disposal unit 50 at the end part. The waste GB introduced through the first disposal port 11, the second disposal port 21, and the third disposal port 31 drops onto the belt of the waste transport unit 70, and is transported to the disposal unit 50 by driving the belt.

In FIG. 7, the sample measuring system 100 includes a waste transport unit 70 that is individually provided for a plurality of measurement units MU. That is, the waste transport unit 70 includes a first waste transport unit 75 for transporting the waste GB discharged from the first disposal port 11 of the first measurement unit 10, a second waste discharge unit 76 for transporting the waste GB discharged from the second disposal port 21 of the second measurement unit 20. In this way the first waste transport unit 75 and the second waste transport unit 76 can independently transport the waste GB of the first measurement unit 10 and the second measurement unit 20. For example, design constraints of each measurement unit can be reduced compared with the case where the waste transport unit 70 is shared by the first measurement unit 10 and the second measurement unit 20 since the first waste transport unit 75 and the second waste transport unit 76 can be separately provided, for example, when the first measurement unit 10 and the second measurement unit 20 are provided in separate housings.

In FIG. 7, the first measurement unit 10 and the second measurement unit 20 are disposed adjacent to each other, and the first waste transport unit 75 and the second waste transport unit 76 are connected in the transport direction of the waste GB. A second waste transport unit 76 is disposed at one end of the first waste transport unit 75, and a disposal unit 50 is disposed at the other end of the first waste transport unit 75. The second waste transport unit 76 holds the waste GB input in the second disposal port 21 and delivers the waste GB to the first waste transport unit 75; the first waste transport unit 75 then transfers the waste GB to the disposal unit 50.

In this way, in FIG. 7, the first waste transport unit 75 and the second waste transport unit 76 are configured to transport the waste GB to the disposal unit 50. In this way waste GB input to the first waste transport unit 75 and the second waste transport unit 76 can be discarded in the shared disposal unit 50 even when the waste GB generated in any of the measuring units MU cannot be directly conveyed to the disposal unit 50. As a result, even when one of the measuring units MU cannot directly convey the waste GB to the disposal unit 50, it is possible to provide the common disposal unit 50, so that the work burden of the user when disposing the waste GB is effectively alleviated.

In the example of FIG. 7, the first waste transport unit 75 and the second waste transport unit 76 include a waste GB transport path 77 configured to be capable of delivering waste GB. In this way the waste GB can be easily transported by the transport path 77.

Figure 7A:
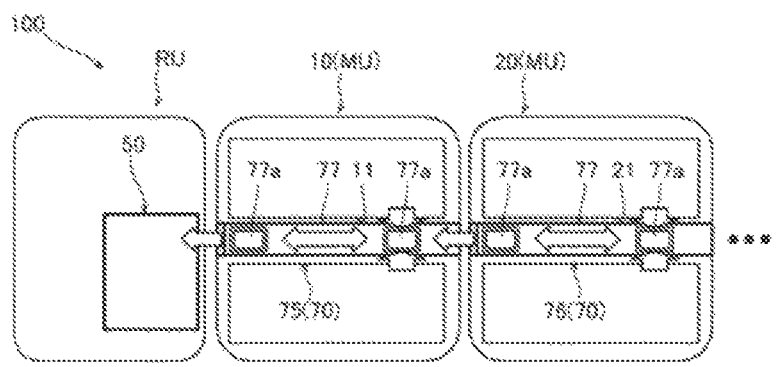
FIG. 7A and FIG. 7B are schematic views showing a third structural example of the disposal unit and the waste transport unit.
Figure 7B:
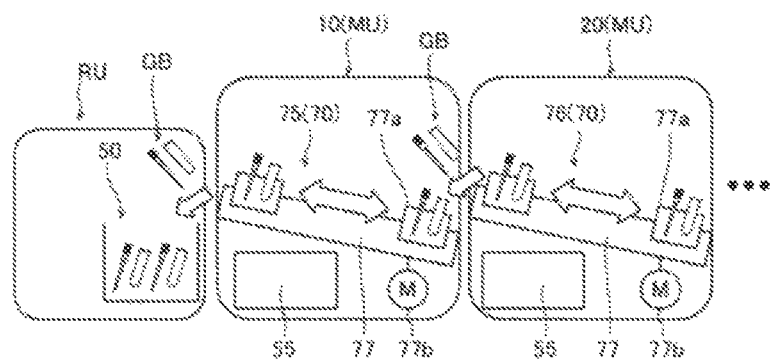

Specifically, as shown in FIG. 7B, the first waste transport unit 75 and the second waste transport unit 76 include a transport path 77 and a waste container 77a movable on the transport path 77. The first waste transport unit 75 and the second waste transport unit 76 can reciprocatingly move the waste container 77a along the transport path 77 by drive of a motor 77b. In the example of FIG. 7A, the first disposal port 11 and the second disposal port 21 open so as to extend along the transport path 77 above the transport path 77. The first measurement unit 10 and the second measurement unit 20 can input the waste GB to an arbitrary position on the transport path 77 via respective the waste ports. The first waste transport unit 75 and the second waste transport unit 76 move the waste container 77a to just below the input position of the waste GB and accept the input waste GB into the waste container 77a. The second waste transport unit 76 moves the waste container 77a to the end of the transport path 77, and transfers the waste GB to the waste container 77a of the first waste transport unit 75. The first waste transport unit 75 moves the waste container 77a to the end of the transport path 77 and transfers the waste GB to the disposal unit 50.

In this way, in the configuration example of FIG. 7, it is possible to deliver the waste GB between the adjacent measurement units MU. Therefore, in the sample measuring system 100, this configuration is particularly suitable for connecting three or more measuring units MU. That is, the third measurement unit, the fourth measurement unit and the like are sequentially connected so as to be adjacent to the second measurement unit 20 in FIG. 7 to deliver waste GB generated in each measurement unit MU to the shared disposal unit 50. Therefore, variations of the apparatus configuration of the sample measuring system 100 can be easily constructed according to the required processing capability.

In the examples shown in FIG. 6 and FIG. 7, the sample measuring system 100 is provided with a waste GB collection unit RU including a disposal unit 50. The collection unit RU is provided separately from the measurement unit MU such as the first measurement unit 10 and the second measurement unit 20. As shown in FIG. 7, each measurement unit MU may be provided with an individual disposal unit 55 separate from the disposal unit 50 of the collection unit RU. In this case, when a plurality of measuring units MU are not connected, the waste GB can be stored in the individual disposal unit 55 in each measuring unit MU.

Waste Input Unit

As shown in FIGS. 1 and 5, the sample measuring system 100 is provided with a waste input unit 60 to input waste GB to the first disposal port 11 and/or second disposal port 21 to hold and transfer the waste GB. It is possible to easily introduce the generated waste GB into the first disposal port 11 and/or the second disposal port 21 by the waste input unit 60.

In the examples of FIG. 1 and FIG. 5, the waste input unit 60 is provided for each measurement unit MU. That is, the waste input unit 60 includes a first waste input unit 61 that holds the waste GB generated at the first measurement unit 10 and inputs the waste GB to the first disposal port 11, and a second waste input unit 62 that holds the waste GB generated in the second measurement unit 20 and inputs the waste GB the second disposal port 21.

The first waste input unit 61 is provided in the first measurement unit 10 and the second waste input unit 62 is provided in the second measurement unit 20. The first waste input unit 61 and the second waste input unit 62 operate independently of each other. The first waste input unit 61 transfers the waste GB generated by the first measurement unit 10 to the first disposal port 11 but does not transfer the waste GB of the second measurement unit 20. The second waste input unit 62 transfers the waste GB generated by the second measurement unit 20 to the second disposal port 21 but does not transfer the waste GB of the first measurement unit 10. Therefore, the first waste input unit 61 does not move within the second measurement unit 20 and the second waste input unit 62 does not move within the first measurement unit 10.

In this way the waste GB can be introduced independently into the first disposal port 11 of the first measurement unit 10 and the second disposal port 21 of the second measurement unit 20 by the first waste input unit 61 and the second waste input unit 62, respectively. As a result, it is possible to effectively avoid interference between the measurement units due to the disposal of the waste GB, as compared with the case where the waste input unit 60 is provided common to the first measurement unit 10 and the second measurement unit 20.

In the example of FIG. 1, the first measurement unit 10 and the second measurement unit 20 each include a measurement unit 40 that receives a reaction container 90 and measures a sample in the received reaction container 90. That is, the reaction container 90 is put in and taken out from the measuring unit 40. The first waste input unit 61 inputs the used reaction container 90 measured by the measurement unit 40 of the first measurement unit 10 into the first disposal port 11. The second waste input unit 62 inputs the used reaction container 90 measured by the measurement unit 40 of the second measurement unit 20 into the second disposal port 21.

In this way the reaction container 90 used in the measurement unit 40 can be input to the first disposal port 11 and the second disposal port 21 in the respective measurement unit by the first waste input unit 61 and the second waste input unit 62y. Therefore, the measured reaction container 90 can be quickly discharged from the inside of the measurement unit 40 compared to a case where, for example, a single waste input unit transfers the measured reaction container 90 across the measurement unit to the disposal port. As a result, it is possible to promptly receive and start measurement of the next reaction container 90 by the measuring unit 40.

More specifically, the first waste input unit 61 is arranged in a first area A1 in which the first measurement unit 10 can operate without interfering with the second measurement unit 20, and the second waste input unit 62 is arranged in the second area A2 in which the second measurement unit 20 can operate without interfering with the first measurement unit 10.

Note that "operate without interfering" means that one of the first measurement unit 10 and the second measurement unit 20 can perform an operation independently of the operational state of the other measurement unit. In FIG. 1 and FIG. 5, the first area A1 and the second area A2 are configured as arrangement areas of the measurement units MU that are partitioned from each other in the housing. Therefore, the first measurement unit 10 and the second measurement unit 20 can operate without interfering with each other insofar as they do not operate across the first area A1 and the second area A2.

Therefore, the first waste input unit 61 can input waste GB to the first disposal port 11 irrespective of the operation of the second measurement unit 20, and the second waste input unit 62 can input waste GB into the second disposal port 21 irrespective of the operation of the first measurement unit 10. According to this configuration, the waste GB can be discarded independently without interfering with each other in the first measurement unit 10 and the second measurement unit 20. Therefore, the measurement process can be completed independently in each of the first measurement unit 10 and the second measurement unit 20.

In the example of FIG. 1, the first disposal port 11 is arranged in a first area A1 in which the first measurement unit 10 can operate without interfering with the second measurement unit 20, and the second disposal port 21 is arranged in the second area A2 in which the second measurement unit 20 can operate without interfering with the first measurement unit 10. In this way the waste GB can be discarded independently without the first measurement unit 10 and the second measurement unit 20 interfering with each other. Therefore, the measurement process can be completed independently in each of the first measurement unit 10 and the second measurement unit 20.

Note that in the example of FIG. 6 each measurement unit MU is configured to function as an independent measuring device accommodated in a separate housing. Therefore, the entire interiors of the first measurement unit 10 and the second measurement unit 20 are the first area A1 and the second area A2, respectively.

The waste input unit 60 also may be provided in common to the first measurement unit 10 and the second measurement unit 20.

Measurement Unit

The sample measuring system 100 may include not only the first measurement unit 10 and the second measurement unit 20 but also three or more measurement units MU. In FIG. 5 and FIG. 6, the sample measuring system 100 includes three measurement units MU. That is, the sample measuring system 100 includes a first measurement unit 10, a second measurement unit 20, and a third measurement unit 30. The sample measuring system 100 also may include four or more measurement units MU.

In the examples of FIGS. 5 and 6, the first measurement unit 10, the second measurement unit 20, and the third measurement unit 30 each have a measurement unit 40. The third measurement unit 30 includes a third disposal port 31 connected to a disposal unit 50 for discharging the waste GB generated in the third measurement unit 30. For this reason, in the examples of FIGS. 5 and 6, the waste GB introduced into the first disposal port 11, the second disposal port 21, and the third disposal port 31 is stored in the common disposal unit 50.

The measurement unit MU may be a measurement unit that performs blood coagulation measurement, immunoassay, blood cell analysis or the like.

Blood Coagulation Measurement

Figure 8:
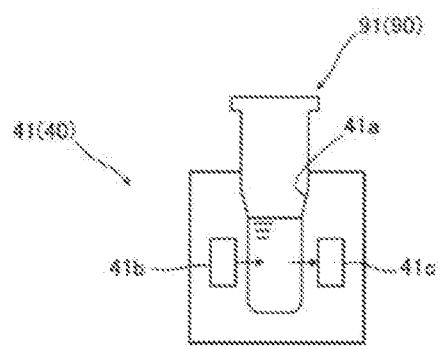
FIG. 8 is a view showing a measurement unit of a measurement unit for coagulation measurement.

For example, in FIG. 1 and FIGS. 5 to 7, one of the first measurement unit 10 and the second measurement unit 20 is a unit for blood coagulation measurement. The measurement unit for blood coagulation measurement measures changes accompanying a coagulation reaction of blood in the sample after preparing a measurement sample by mixing the blood sample and a reagent. As shown in FIG. 8, the measurement unit 41 of the unit for blood coagulation measurement includes a container holding unit 41a for holding a reaction container 90 containing a sample, a light-transmitting unit 41b for irradiating the sample in the reaction container 90 with measurement light, and a light receiving unit 41c for detecting the light irradiated from the sample. In this manner, the measuring unit 41 receives the reaction container 90 and measures the sample in the received reaction container 90.

The measurement unit 41 of the unit for measuring blood coagulation irradiates light from the light transmitting unit 41b to the measurement sample prepared by adding a reagent to the specimen, and the light receiving unit 41c measures the transmitted light or scattered light of the light irradiated from the measurement sample. The specimen is plasma or serum separated from the blood. The measurement unit 40 analyzes the sample using a coagulation method, a synthetic substrate method, an immunoturbidimetric method, or an agglutination method. The sample measuring system 100 analyzes the sample based on the detected light.

In the coagulation method, the measurement sample is irradiated with light, and the coagulation time at which fibrinogen in the sample is converted to fibrin is measured based on the electric signal of transmitted light or scattered light from the sample. PT (prothrombin time), APTT (activated partial thromboplastin time), Fbg (amount of fibrinogen) and the like are included as measurement items of the coagulation method.

In the synthetic substrate method, light is irradiated on a measurement sample, and the degree of coloration due to the action of a chromogenic synthetic substrate for the enzyme in the measurement sample is measured based on the electric signal of the transmitted light from the sample. Measurement items of the synthetic substrate method include ATIII (antithrombin III), α2-PI (α2-plasmin inhibitor), PLG (plasminogen) and the like.

In the immunoturbidimetric method, a reagent that causes an antigen-antibody reaction to coagulation/fibrinolysis factors or the like in a specimen is added to the sample, and the substance contained in the reagent aggregates as a result of antigen-antibody reaction. In the immunoturbidimetric method, the measurement sample is irradiated with light, and the aggregation rate of the reagent-containing substance in the measurement sample is measured based on the electric signal of the transmitted light or the scattered light from the sample. Measurement items of immunoturbidimetric methods include D dimer, FDP (fibrin degradation product), and the like.

In the agglutination method, light is irradiated to a measurement sample, and a change in absorbance in a process in which platelets or the like in a measurement sample undergo agglutination reaction is measured based on an electrical signal of transmitted light from the sample. Measurement items of the agglutination method include vWF: RCo (von Bill brand ristocetin cofactor) and platelet aggregation ability.

Immunoassay

For example, any one of the first measurement unit 10 and the second measurement unit 20 also may be a unit for immunoassay. A measurement unit for immunoassay uses an antigen-antibody reaction between a target component in blood and a component in a reagent to detect a target component. For example, antigens or antibodies, proteins, peptides and the like contained in blood may be detected as target components. The immunoassay device acquires serum or plasma as a sample and quantitatively or qualitatively measures antigens or antibodies or the like contained in the sample. Note that the antigen-antibody reaction includes not only a reaction between an antigen and an antibody but also a reaction using a specific binding substance such as an aptamer. An aptamer is a nucleic acid molecule or peptide synthesized to specifically bind to a specific substance.

Figure 9:
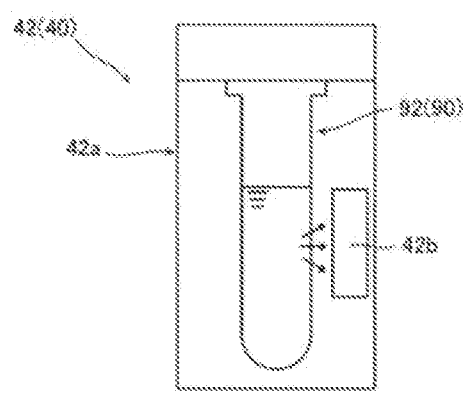
FIG. 9 is a view showing a measurement unit of a measurement unit for immunoassay.

As shown in FIG. 9, the measurement unit 42 of the unit for immunoassay includes a container holding unit 42a for holding a reaction container 90 containing a sample, and detection unit 42b for detecting a signal based on a labeling substance bonded to a target substance in the sample contained in the reaction container 90. In this way the measurement unit 42 receives the reaction container 90 and measures the sample in the received reaction container 90. Measurement unit 42 of the unit for immunoassay measures chemiluminescence based on the light generated from the sample in the reaction container 90, that is, the target substance contained in the sample. The sample measuring system 100 generates measurement data based on the light measured by the measurement unit 42.

Here, chemiluminescence is light emitted using energy from a chemical reaction. Chemiluminescence is, for example, light emitted when a molecule is excited by a chemical reaction to an excited state and returns from an excited state to a ground state. The chemiluminescence measured by the measuring unit 42 is based on the enzyme immunochemical luminescence method (CLEIA), for example, and is light generated by the reaction between the enzyme and the substrate.

The enzyme immunoassay luminescence measurement method, for example, is a 2-STEP method in which (1) a target substance in a sample is carried on a solid phase carrier in a reaction container 9; (2) a primary BF separation is performed to separate the solid phase carrier carrying a target substance and a liquid phase; (3) a labeling substance is bound to the solid phase carrier carrying the target substance in the reaction container 90; (4) a secondary BF separation is performed; (5) a chemiluminescent substrate is added to the reaction container 90 to generate an enzymatic reaction. In addition to the 2-STEP method, the known 1-STEP method, the D-1 STEP method (delayed one step method) and the like are available as enzyme immunochemical luminescence measurement methods. The measurement item of the 2-STEP method is HBsAg. One measurement item of the 1-STEP method is HBsAb. Measurement items of D-1 STEP method include FT3, FT4, TSH and others.

Note that the chemiluminescence measured by the measurement unit 42 may be light based on chemiluminescence analysis (CLIA), electrochemiluminescence analysis (ECLIA), fluorescence enzyme assay (FEIA method), LOCI method (Luminescent Oxygen Channeling Immunoassay), BLEIA method (bioluminescent enzyme immunoassay) or the like.

Blood Cell Analysis

Figure 10A:
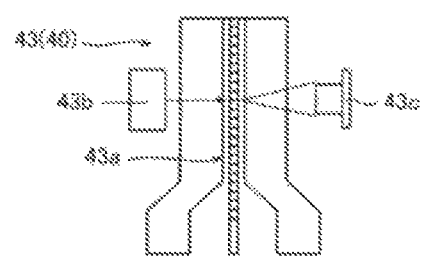
FIG. 10A and FIG. 10B show a measurement unit of a measurement unit for blood cell analysis.

For example, any one of the first measurement unit 10 and the second measurement unit 20 also may be a measurement unit for blood cell analysis. In the measurement unit for blood cell analysis, a measurement sample prepared by mixing a blood sample and a reagent is caused to flow through the flow path, and blood cell components flowing in the flow path are detected and counted. As shown in FIG. 10A, the measurement unit 43 of the unit for blood cell analysis performs measurement by flow cytometry, for example. That is, the measurement unit 43 includes a flow path unit 43a for circulating the sample, a light transmitting unit 43b for irradiating measurement light to the sample flowing through the flow path unit 43a, and a light receiving unit 43c for detecting light irradiated from the sample.

The measurement unit 43 causes particles such as cells to flow in the flow of the sheath liquid formed in the flow path unit 43a, irradiates the flowing particles with laser light from the light transmitting unit 43b, and scattered light and fluorescence are detected by the light receiving unit 43c. The sample measuring system 100 analyzes individual particles based on the light measured by the measurement unit 43. For example, a scattergram combining scattered light intensity and fluorescence intensity as parameters is created, and the sample is analyzed based on the scattergram distribution and the like. Measurement items by the flow cytometry method include NEUT (neutrophil), LYMPH (lymphocyte), MONO (monocyte), EO (eosinophil) and BASO (basophil).

Figure 10B:
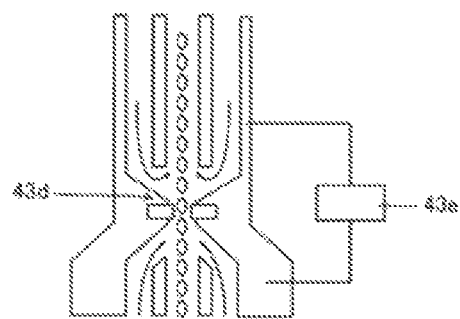

As shown in FIG. 10B, the measurement unit 43 of the unit for blood cell analysis also may perform measurement by the sheath flow DC detection method, for example. That is, the measurement unit 43 includes a flow path part 43d provided with an opening through which a sample flows, and a detection unit 43e detects an electrical change between a pair of electrodes (not shown) arranged so as to face each other across the opening. The measurement unit 43 causes particles such as cells to flow into the flow of the sheath liquid passing through the opening, and a direct current flows between the electrodes. The measuring unit 43 detects individual particles based on a pulse-like current change when the particles pass through the opening. Measurement items by the sheath flow DC detection method include the number of WBC (white blood cell), RBC (red blood cell), HGB (hemoglobin amount), HCT (hematocrit), MCV (average red blood cell volume), MCH (average hemoglobin amount), MCHC (Average hemoglobin concentration), PLT (platelet count), and the like.

Specific Structural Example of Sample Measuring System

Next, a specific structural example of the sample measuring system 100 will be described in detail with reference to FIG. 11 to FIG. 25. In the examples of FIG. 11 to FIG. 25, the sample measuring system 100 includes two measurement units MU, a first measurement unit 10 and a second measurement unit 20. The sample measuring system 100 also includes an analysis unit 450 (see FIG. 24) that controls the entire sample measuring system 100 including the first measurement unit 10 and the second measurement unit 20.

Figure 11:
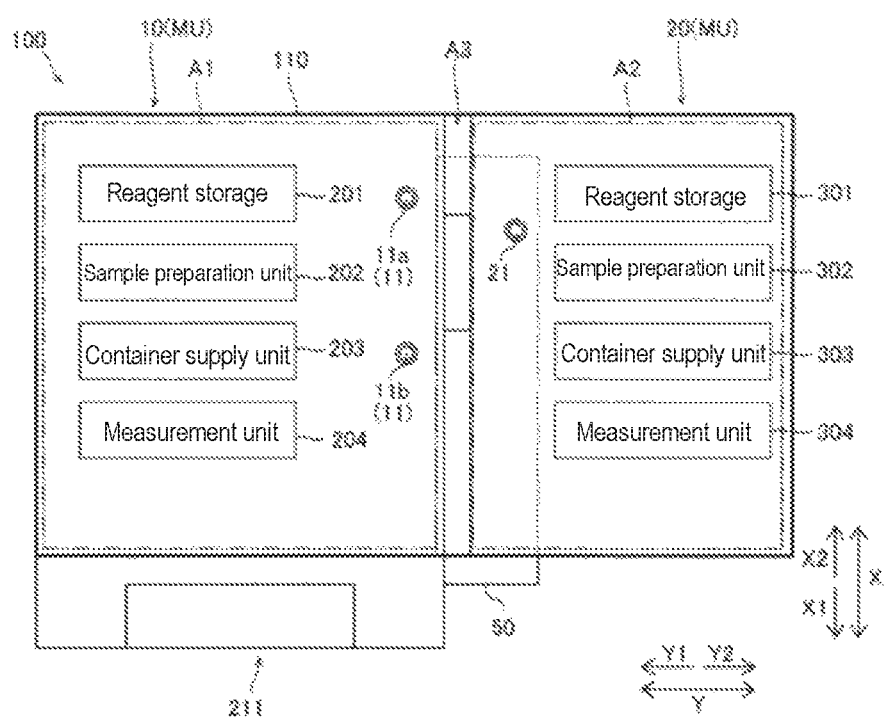
FIG. 11 is a schematic diagram illustrating a specific structural example of a sample measuring system.

As shown in FIG. 11, the sample measuring system 100 includes a housing 110 that houses the first measurement unit 10 and the second measurement unit 20. The housing 110 has a rectangular box shape, and a sample transport unit 211 (described later) is arranged on the front side. In the sample measuring system 100, the X1 direction side where the sample transport unit 211 described below is disposed is referred to as the front side, and the side opposite to the X1 direction is referred to as the back side. The X2 direction is the depth direction of the sample measuring system 100. The Y direction orthogonal to the X direction in the horizontal plane is taken as the lateral direction of the sample measuring system 100.

The first measurement unit 10 and the second measurement unit 20 are arranged side by side in the housing 110 in the lateral direction. In the housing 110, the first measurement unit 10 is disposed on the Y1 direction side with the intermediate area A3 in between, and the second measurement unit 20 is disposed on the Y2 direction side. In the example of FIG. 11, the area on the Y1 direction side across the intermediate area A3 in the housing 110 is the first area A1. In the housing 110, the area on the Y2 direction side across the intermediate area A3 is the second area A2. The first area A1 and the second area A2 also may be directly adjacent to each other without providing the intermediate area A3.

The first disposal port 11 is arranged in the first area A1 and the second disposal port 21 is arranged in the second area A2. In the example of FIG. 11, the first disposal port 11 is provided at two places of the first measurement unit 10. The second disposal port 21 is provided at one location of the second measurement unit 20. A disposal unit 50 also is provided in the lower portion of the housing 110. The positional relationship between the disposal unit 50 and the first disposal port 11 and the second disposal port 21 will be described later.

The first measurement unit 10 and the second measurement unit 20 each include measurement units 204 and 304 for measuring samples in the first area A1 and the second area A2, respectively. The measurement unit 204 of the first measurement unit 10 and the measurement unit 304 of the second measurement unit 20 have different measurement principles or measurement items. Specifically, the first measurement unit 10 is a unit for blood coagulation measurement. The second measurement unit 20 is a unit for immunoassay. In this way multi-item sample measurement that cannot be measured by the same measurement unit can be collaboratively performed by the sample measuring system 100. Unlike the case of using a plurality of measurement apparatuses having different measurement principles or measurement items, the user can collectively dispose of each waste GB by the common disposal unit 50.

The first measurement unit 10 and the second measurement unit 20 each include a reagent storage 201, 301 for accommodating a reagent container in the first area A1 and the second area A2. In the reagent storage 201 of the first measurement unit 10, a reagent container for accommodating a reagent for blood coagulation measurement is installed. In the reagent storage 301 of the second measurement unit 20, a reagent container for accommodating a reagent for immunoassay is installed. In this way the process using the reagent can be independently performed in the first measurement unit 10 and the second measurement unit 20 since the reagent containers used for sample measurement can be installed separately in the first area A1 and the second area A2.

The first measurement unit 10 and the second measurement unit 20 each include a sample preparation unit 202, 302 for preparing a sample for measurement from a sample in the first area A1 and the second area A2. The sample preparation unit 202 of the first measurement unit 10 mixes the sample and the reagent to prepare a sample for blood coagulation measurement. The sample preparation unit 302 of the second measurement unit 20 mixes the sample and the reagent and prepares a sample for immunoassay. The sample preparation units 202 and 302 include, for example, one or more mechanisms used in sample preparation such as a reagent dispensing unit for dispensing a reagent, a heating unit for heating a sample to a temperature for promoting a reaction between a sample and a reagent. In this way it is possible to separately prepare the samples used for measurement in the first area A1 and the second area A2, so that the preparation process of the sample for measurement is independent in the first measurement unit 10 and the second measurement unit 20.

The first measurement unit 10 and the second measurement unit 20 each include a container supply unit 203, 303 for supplying the reaction container 90 to the first area A1 and the second area A2. The container supply unit 203 of the first measurement unit 10 supplies a first reaction container 91 (see FIG. 3) for blood coagulation measurement. The container supply unit 303 of the second measurement unit 20 supplies the second reaction container 92 (see FIG. 3) for immunoassay.

In this way the first measurement unit 10 and the second measurement unit 20 can prepare a sample for measurement in the reaction container without interfering with each other in the examples of FIGS. 11 to 25. The first measurement unit 10 and the second measurement unit 20 can measure the sample by the measurement units 204 and 304 without interfering with each other. Then, the first measurement unit 10 can discharge the waste GB from the first disposal port 11 to the disposal unit 50 without interfering with the second measurement unit 20, and the second measurement unit 20 can discharge the waste GB from the second disposal port 21 to the disposal unit 50 without interfering with the first measurement unit 100.

Configuration of First Measurement Unit

Figure 12:
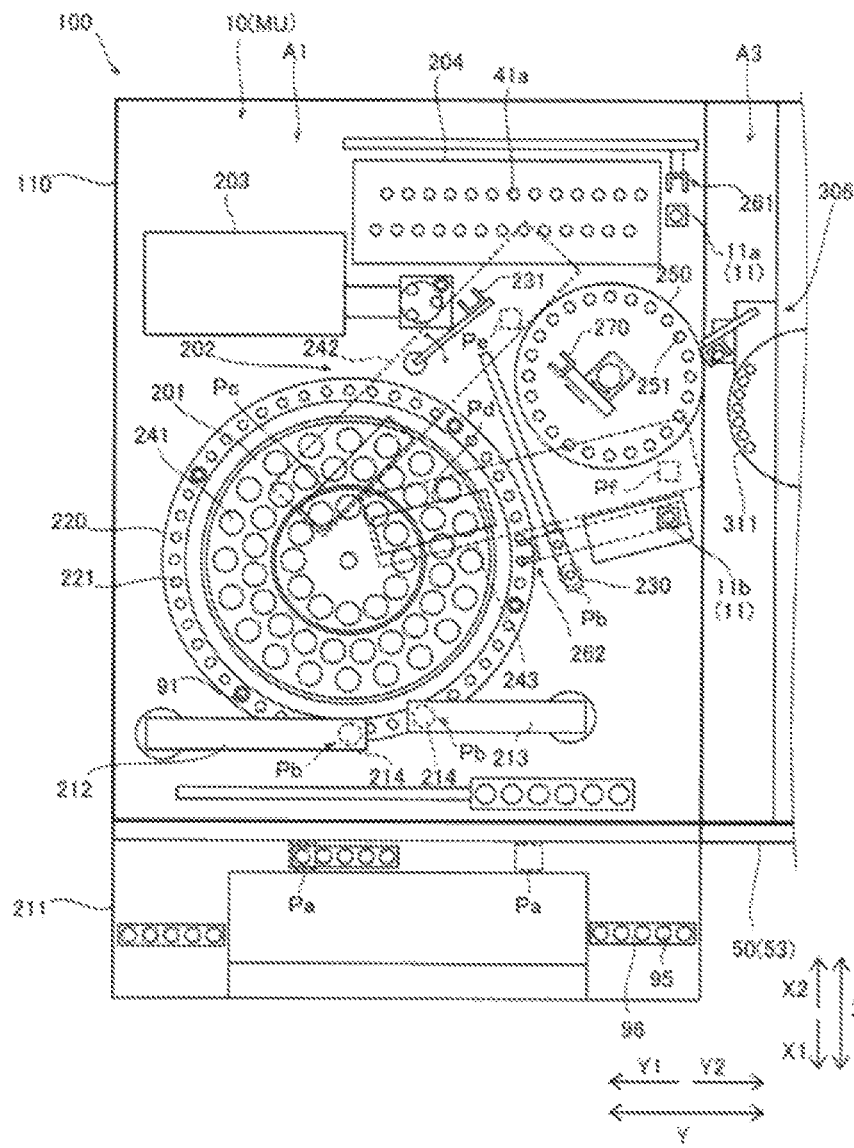
FIG. 12 is a schematic plan view showing a first measurement unit in the structural example of FIG. 11.

As shown in FIG. 12, the first measurement unit 10 includes a sample transport unit 211 and sample dispensing units 212 and 213.

A sample rack 96 is installed in the sample transport unit 211. A plurality of sample containers 95 containing samples can be set in the sample rack 96. The sample transport unit 211 transports the sample rack 96 installed by the user, and positions each sample container 95 at a predetermined sample suctioning position Pa in plan view. A label (not shown) having identification information recorded in a barcode or the like is affixed to the sample rack 96 and the sample container 95. The identification information of the sample rack 96 and the sample container 95 is read out by a reader installed in the middle of the transport path. Depending on the identification information, the sample in the sample container 95 and the measurement result of the sample are associated and managed. The sample container 205 is, for example, a blood collection tube.

The sample dispensing units 212 and 213 are configured to dispense the sample supplied to the sample preparation unit 202 from the sample container, respectively. Specifically, each of the sample dispensing units 212 and 213 is configured to suction a sample from the sample container 95 that contains the sample, and dispense the suctioned sample in a fixed amount into the first reaction container 91.

Each of the sample dispensing units 212 and 213 is configured by a dispensing arm which holds a pipette 214 for pipetting the sample in a swingable manner. The pipette 214 is connected to a pump (not shown), so that the sample can be quantitatively suctioned and discharged. The sample dispensing units 212 and 213 can respectively move a pipette 214 to suction a predetermined amount of sample from the sample container 95 at the sample suction position Pa. The sample dispensing units 212 and 213 respectively move the pipette 214 and can discharge the suctioned sample into the first reaction container 91 arranged at a predetermined sample dispensing position Pb.

The first measurement unit 10 also may be configured not to include the sample transport unit 211 and the sample dispensing units 212 and 213, but to measure the first reaction container 91 to which the sample has been quantitatively dispensed in advance.

The first measurement unit 10 includes a mechanism for transferring the first reaction container 91 containing the sample and the reagent, and preparing the measurement sample to each unit. In the structural example of FIG. 2, the first measurement unit 10 includes a container table 220. The container table 220 has an annular shape in plan view and can rotate in the circumferential direction. The container table 220 includes a plurality of holding holes 221 arranged along the circumferential direction. The first reaction container 91 can be installed one by one in each holding hole 221. The sample dispensing unit 212 can dispense suctioned sample to the new first reaction container 91 held in the container table 220 at the sample dispensing position Pb in plan view. The sample dispensing units 212 and 212 can also suction the sample from the first reaction container 91 containing the sample on the container table 220.

The first measurement unit 10 includes a transfer unit 230 that positions a new first reaction container 91 at the sample dispensing position Pb. The transfer unit 230 can move, along rails, an installation base having holding holes for installing the first reaction container 91. For example, two holding holes are provided. The sample dispensing unit 213 can dispense the suctioned sample to the new first reaction container 91 held in the transfer unit 230 at the sample dispensing position Pb.

Many new first reaction containers 91 are stored in the container supply unit 203, and taken out one by one. The first reaction container 91 taken out by the container supply unit 203 is gripped by the gripping mechanism 231 and taken out. The gripping mechanism 231 can place the removed first reaction container 91 in the holding hole 221 of the container table 220 or the holding hole of the transfer unit 230.

The sample preparation unit 202 of the first measurement unit 10 has a function of adding a reagent to the sample in the first reaction container 91 to prepare a measurement sample. The measurement sample is a mixed solution of the sample and the reagent.

The sample preparation unit 202 includes reagent dispensing units 242 and 243 for suctioning and discharging reagent from the reagent container 241 installed in the reagent storage 201.

The reagent storage 201 is configured to accommodate a reagent container 241 used for measurement. The reagent storage 201 is disposed inside the container table 220 and has a circular shape in plan view. In the reagent storage 201, a plurality of reagent containers 241 can be installed along the circumferential direction. The reagent storage 201 is rotatable in the circumferential direction and can rotate an arbitrary reagent container 241 to the reagent suctioning positions Pc and Pd in plan view.

The reagent dispensing units 242 and 243 are provided with a pipette (not shown) for dispensing the reagent. The pipette is connected to a pump (not shown), and can perform quantitative suction and discharge of the reagent. The reagent dispensing units 242 and 243 can respectively suction a predetermined amount of reagent from the reagent container 241 positioned at predetermined reagent suction positions Pc and Pd on the reagent storage 201. Each of the reagent dispensing units 242 and 243 can move the pipette to the reagent dispensing positions Pe and Pf in plan view, and discharge a predetermined amount of reagent to the first reaction container 91 at the reagent dispensing position.

The sample preparation unit 202 includes a heating table 250 for holding and heating the first reaction container 91 in which the sample is dispensed. The heating table 250 has a plurality of holding holes 251 for respectively holding a plurality of first reaction containers 91 containing samples, and heater (not shown) for heating the first reaction containers 91 held a plurality of holding holes 25. The heating table 250 also is provided with a first container transfer unit 270 for grasping and transferring the first reaction container 91.

The heating table 250 has a circular shape in plan view, and a plurality of holding holes 251 are arranged along the circumferential direction. The heating table 250 is rotatable in the circumferential direction and can rotate the first reaction containers 91 installed in the plurality of holding holes 251 in the circumferential direction while heating to a predetermined temperature by the heater. The first container transfer unit 270 grips and transfers the first reaction container 91, installs the first reaction container 91 in the holding hole 251, and can take out the first reaction container 91 from the holding hole 251. The first container transfer unit 270 is disposed on the upper surface of the central portion of the heating table 250 and is configured to be able to turn around the rotation axis and to advance and retract the grip portion in the radial direction.

The first container transferring unit 270 can transfer the first reaction container 91 installed in the container table 220 or the transfer unit 230 to the holding hole 251 of the heating table 250. The first container transfer unit 270 also can remove the heated first reaction container 91 in the holding hole 251 of the heating table 250, and transfer the first reaction container 91 to the reagent dispensing positions Pe and Pf, respectively. The first container transfer unit 270 returns the first reaction container 91, into which the reagent has been dispensed by the reagent dispensing unit 242 or 243, to the holding hole 251 of the heating table 250.

The first measurement unit 10 also may be configured to not include the reagent storage 201, the reagent dispensing unit 242 or 243, and the heating table 250, but to perform measurement with respect to the first reaction container 91 in which the prepared measurement sample is stored in advance.

The measurement unit 204 of the first measurement unit 10 has the same configuration as the measurement unit 41 shown in FIG. 8. The measurement unit 204 includes a container holding unit 41a, a light transmitting unit 41b, and a light receiving unit 41c, and performs optical measurement on the measurement sample in the first reaction container 91.

In the configuration example of FIG. 12, the measurement unit 204 includes a plurality of container holding units 41a. The measuring unit 204 linearly extends in the Y direction along one side of the first measuring unit 10 on the back side (X2 direction side) in a plan view, and the plurality of container holding units 41a are arranged with a predetermined interval in two straight lines. The container holding unit 41a is a hole in which the first reaction container 91 can be installed.

The first measuring unit 10 includes gripping mechanisms 261 and 262 that can transfer the first reaction container 91 to the two first disposal ports 11, respectively. Each of the gripping mechanisms 261 and 262 is configured as a first waste input unit 61.

The gripping mechanisms 261 and 262 are provided with a moving mechanism (not shown) in each of the X, Y, and Z directions which are orthogonal three axis directions, and can grip and transfer the first reaction container 91. The gripping mechanism 261 removes the first reaction container 91 from the holding hole 251 of the heating table 250, transfers the container 91 to the reagent dispensing position Pe, and the first reaction container 91 is placed in the container holding unit 41a of the measurement unit 204 after the reagent is dispensed. The gripping mechanism 261 can take the measured first reaction container 91 from the container holding unit 41a and transfer the container 91 to the first disposal port 11a. In this way the gripping mechanism 261 not only transfers the first measured reaction container 91 as the waste GB to the first waste port 11, but also transfers the first reaction container 91 containing the sample before the measurement to the measurement unit 204.

The gripping mechanism 262 can remove the unnecessary first reaction container 91 from the holding hole 221 of the container table 220 and transfer the container 91 to the first disposal port 11.

Each part of the above first measurement unit 10 is arranged in the first area A1.

The first measurement unit 10 also can deliver the sample dispensed by the sample dispensing units 212, 213 provided in the first area A1 to the second measurement unit 20. Specifically, the sample measuring system 100 includes a delivery mechanism 306 for delivering a sample from the first area A1 to the second area A2. The sample in the sample container 95 placed in the sample transport unit 211 of the first measurement unit 10 is delivered to the second measurement unit 20 by the delivery mechanism 306. In this way the sample can be dispensed and sent to the second measurement unit 20 by merely placing the sample container 95 in the first measurement unit 10. Therefore, it is unnecessary to prepare two sets of sample containers 95 for the same sample and place them in the first measurement unit 10 and the second measurement unit 20, respectively, so that the burden on the user involved in the measurement can be reduced.

Specifically, the delivery mechanism 306 transfers the sample quantitatively dispensed to the first reaction container 91 by the sample dispensing unit 212 or 213 to the second measurement unit 20 together with the first reaction container 91. That is, the sample dispensing unit 212 or 213 dispenses the sample into the first reaction container 91. The delivery mechanism 306 is configured to deliver the first reaction container 91 with the dispensed sample to the second area A2. In this way the sample can be easily supplied to the second measurement unit 20 by using the first reaction container 91 unlike the case where the delivery mechanism is configured by, for example, a flow path through which a sample flows and it is necessary to wash the flow path and the like.

Delivery Mechanism

Figure 13:
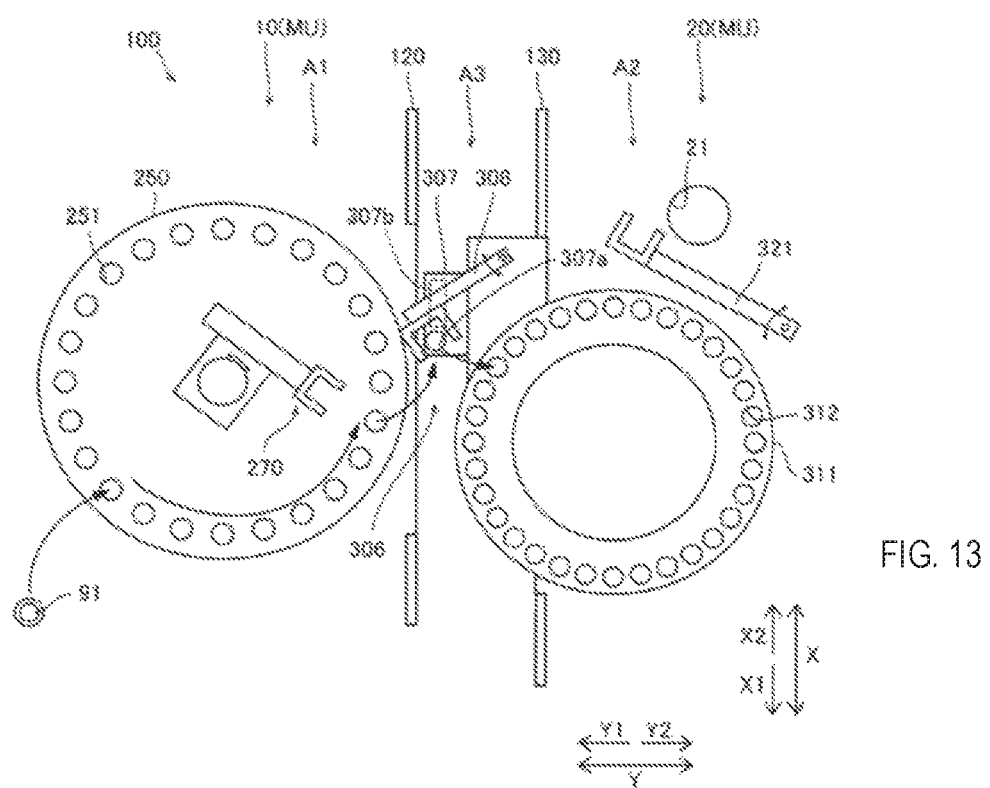
FIG. 13 is a schematic plan view showing a delivery mechanism in the structural example of FIG. 11.

As shown in FIG. 13, the delivery mechanism 306 includes a first container transfer unit 270 disposed in the first measurement unit 10, a second container transfer unit 308 disposed in the second measurement unit 20, and a relay unit 307 capable of holding the reaction container 90 between the first area A1 and the second area A2. In this way on the first measurement unit 10 side, the first reaction container 91 can be delivered to the second measurement unit 20 only by disposing the first reaction container 91 in the relay unit 307 by the first container transfer unit 270. As a result, even when the first reaction container 91 is delivered between the first measurement unit 10 and the second measurement unit 20, it is possible to avoid operational interference as much as possible.

The sample delivered to the second measurement unit 20 is dispensed to the first reaction container 91 prepared for delivery by the sample dispensing units 212 and 213. The first reaction container 91 containing the sample is removed from the container table 220 by the first container transfer unit 270 and transferred to the relay unit 307.

The first container transfer unit 270 is installed on the heating table 250 as described above. The first container transfer unit 270 can install the first reaction container 91 removed from the container table 220 in the relay unit 307.

The relay unit 307 is provided in the intermediate area A3 in the housing 110. The relay unit 307 includes a holding hole 307a for installing the first reaction container 91 and a detection unit 307b for detecting the first reaction container 91 installed in the holding hole 307a. The detection unit 307b is an optical sensor such as a contact type sensor or a photo interrupter, for example.

The second container transfer unit 308 is a gripping mechanism configured to grip and transfer the first reaction container 91. The second container transfer unit 308 is rotatable around a rotation axis in the vertical direction and is vertically movable in the vertical direction. The second container transfer unit 308 can remove the first reaction container 91 installed in the holding hole 307a of the relay unit 307 and place the removed reaction container 91 in the holding hole 312 of the transfer table 311 (described later) arranged in the second area A2. In this way the delivery mechanism 306 passes the first reaction container 91 for delivering the sample from the first measurement unit 10 via the first container transfer unit 270, the relay unit 307, and the second container transfer unit 308 to the second measurement unit 20.

When the detection unit 307b detects that the first reaction container 91 is installed in the relay unit 307, the second measurement unit 20 causes the second container transfer unit 308 to transfer the first reaction container 91 to the second area A2.

Then, when the first reaction container 91 is transferred into the second area A2 by the delivery mechanism 306, the second measurement unit 20 is configured to start measurement of the sample in the first reaction container 91 independently of the first measurement unit 10. In this way the measurement operation in the second measurement unit 20 can be executed independently of the operation of the first measurement unit 10 from the time the first reaction container 91 is transferred into the second area A2. As a result, even when the sample dispensing unit is shared by a plurality of measurement units, it is possible to independently perform the measurement operation without mutually restricting the operations, hence, ensuring secure high processing efficiency. As will be described later, even in the case where the sample measuring system 100 has an expanded configuration in which the second measurement unit 20 is added to the device having the first measurement unit 10, for example, it is possible to make the measurement operation of first measurement unit 10 and the measurement operation of the second measurement unit 20 independent of each other by interposing the delivery mechanism 306. Therefore, it is possible to easily construct the sample measuring system 100 in which the apparatus configuration can be freely expanded.

As will be described later, the sample in the delivered first reaction container 91 is exchanged to the second reaction container 92 by the dispensing unit 350. As shown in FIG. 3, at least one of the shape and the material of the first reaction container 91 and the second reaction container 92 are different.

Specifically, the first reaction container 91 is shorter than the second reaction container 92, has an opening in the upper part 91a, and has a lower part 91b of smaller diameter than the upper part 91a. The first reaction container 91 is formed of a material having a high translucency or high transparency suitable for coagulation measurement by the first measurement unit 10. The second reaction container 92 is taller in height than the first reaction container 91, has an opening in the upper part, and has a substantially constant outer shape. The second reaction container 92 is made of a material which is suitable for immunoassay by the second measurement unit 20 and which is less adsorptive of a labeling substance and target substance.

The measurement accuracy of the first measurement unit 10 and the measurement accuracy of the second measurement unit 20 are guaranteed under prescribed measurement conditions including the physical properties of these reaction containers. Therefore, the measurement accuracy of the first measurement unit 10 and the second measurement unit 20 can be easily guaranteed by separately preparing the reaction containers 90 used for measurement in the first measurement unit 10 and the second measurement unit 20 as the dedicated first reaction container 91 and the second reaction container 92, respectively.

Structure of Second Measurement Unit

Figure 14:
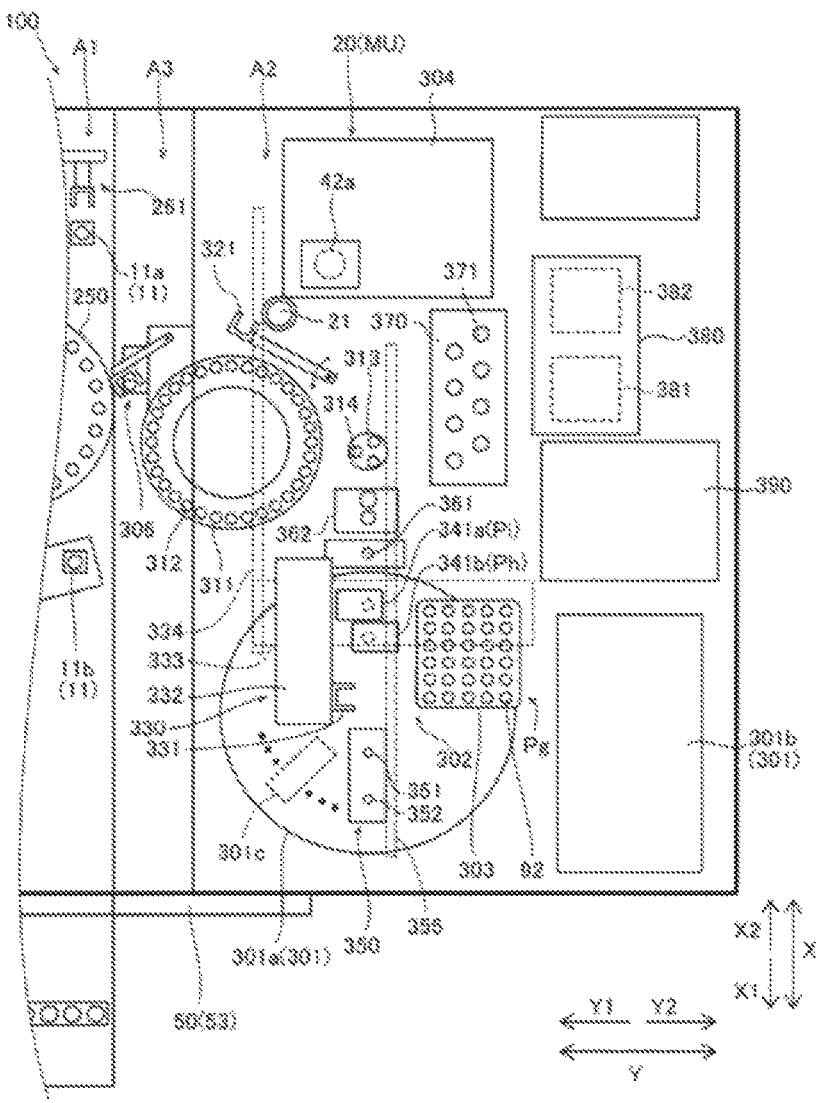
FIG. 14 is a schematic plan view showing a second measurement unit in the structural example of FIG. 11.

As shown in FIG. 14, the second measurement unit 20 includes a reagent storage 301, a sample preparation unit 302, a container supply unit 303, and a measurement unit 304. The second measurement unit 20 also includes a delivery table 311, a gripping mechanism 321, and a sample supply unit 313.

The delivery table 311 has an annular shape in plan view and can rotate in the circumferential direction. The delivery table 311 is provided with a plurality of holding holes 312 arranged along the circumferential direction. Each of the holding holes 312 can be provided with one first reaction container 91. The second container transfer unit 308 is rotatable around a rotation axis in the vertical direction and is vertically movable in the vertical direction.

The gripping mechanism 321 transfers the first reaction container 91 held in the holding hole 312 of the delivery table 311 to the holding hole 314 of the sample supply unit 313. The gripping mechanism 321 also transfers the first reaction container 91 held in the holding hole 314 of the sample supply unit 313 and the previously measured second reaction container 92 into the second disposal port 21. That is, the gripping mechanism 321 is configured as a second waste input unit 62. The gripping mechanism 321 also transfers the second reaction container 92 to the measurement unit 304. The gripping mechanism 321 has a catcher at its tip, is rotatable around a rotation axis in the vertical direction, and is vertically movable in the vertical direction.

The sample supply unit 313 has a circular shape in plan view and can rotate in the circumferential direction. The sample supply unit 313 is provided with a plurality (three) of holding holes 314 arranged along the circumferential direction. Each of the holding holes 314 can accommodate one reaction container. A first reaction container 91 for accommodating a sample is installed in the holding hole 314.

The container supply unit 303 stores a plurality of second reaction containers 92. The second measurement unit 20 includes a reaction container transfer unit 330 for transferring the second reaction container 92. The container supply unit 303 can supply the second reaction containers 92 one by one to the reaction container transfer unit 330 at a predetermined reaction container supply position Pg in plan view. The container supply unit 303 also can move in the front-rear direction (X direction). That is, when the container supply unit 303 is located on the front side (X1 direction side), the second reaction container 92 is supplied by the user. The second reaction container 92 is supplied to the sample measuring system 100 when the container supply unit 303 is moved to the X2 direction side. The supply of the second reaction container 92 may be performed one by one or several containers 92 may be supplied collectively by a rack or the like. The movement of the container supply unit 303 in the front and rear direction also may be performed manually by the user, or may be performed automatically by a driving unit or the like.

The reaction container transfer unit 330 transports the second reaction container 92. The reaction container transfer unit 330 acquires the second reaction container 92 from the reaction container supply position Pg, and transfers the second reaction container 92 to the processing position of each of the heating unit 370, the reagent dispensing unit 380, the spotting unit 361, the BF separation unit 390 and the like. The reaction container transfer unit 330 includes a catcher 331, a support member 332, a support member 333, and a support member 334.

The catcher 331 grips the second reaction container 92. The catcher 331 also can oscillate the second reaction container 92 while gripping the second reaction container 92. The support member 332 supports the catcher 331 movably in the vertical direction (Z direction). The support member 333 supports the support member 332 movably in the lateral direction (Y direction). The support member 334 supports the support member 333 movably in the front-rear direction (X direction). In this way the catcher 331 can move in the horizontal direction (XY direction), and can move in the vertical direction (Z direction).

The reagent storage 301 of the second measurement unit 20 includes a reagent storage 301a and a reagent storage 301b.

The reagent storage 301a has a cylindrical shape and can hold a plurality of reagent containers 301c therein. The reagent storage 301a is provided on the front side (X1 direction side) of the second measurement unit 20. The reagent storage 301a has a circular shape in plan view. In the reagent storage 301a, a plurality of reagent containers 301c can be installed along the circumferential direction. The reagent storage 301a is rotatable in the circumferential direction of the reagent container 301c and can rotate an arbitrary reagent container 301c to a predetermined reagent suction position Ph or Pi in plan view. A cooling mechanism also is provided in the reagent storage 301a, and the reagent in the reagent container 301c installed therein is kept at a constant temperature suitable for storage. In the reagent storage 301a, for example, each reagent container 301c contains either the R1 reagent, the R2 reagent, or the R3 reagent. The reagent suctioning positions Ph and Pi on the upper surface of the reagent storage 301a are respectively provided with a lid 341a that can be opened and closed when suctioning the R1 reagent and the R2 reagent from the reagent container 301c, and a lid 341b that can be opened and closed when suctioning the R3 reagent from the reagent container 301c.

The reagent storage 301b contains reagent containers of R4 reagent and R5 reagent, respectively. The reagent storage 301b keeps the R4 reagent and the R5 reagent at a constant temperature suitable for storage.

The sample preparation unit 302 of the second measurement unit 20 includes a dispensing unit 350, a spotting unit 361, a heating unit 370, a reagent dispensing unit 380, and a BF separation unit 390.

The dispensing unit 350 includes a sample dispensing unit 351 and a reagent dispensing unit 352. The sample dispensing unit 351 is configured by a suction tube that suctions and discharges a sample. The reagent dispensing unit 352 is configured by a suction tube that suctions and discharges the reagent. The reagent dispensing unit 352 is configured to suction and discharge a plurality of kinds of reagents. Specifically, the reagent dispensing unit 352 is configured to suction and discharge the R1 reagent, the R2 reagent, and the R3 reagent. The sample dispensing unit 351 and the reagent dispensing unit 352 are arranged along the X direction. The dispensing unit 350 can integrally move the sample dispensing unit 351 and the reagent dispensing unit 352 in the X direction along the dispensing unit moving mechanism 355 extending in the X direction. The sample dispensing unit 351 and the reagent dispensing unit 352 can individually move up and down in the vertical direction by the dispensing unit moving mechanism 355 at the time of suction and dispensing.

The sample dispensing unit 351 is configured to suction the sample in the first reaction container 91 held in the sample supply unit 313, and to discharge the sample into the second reaction container 92 held in the spotting unit 361. That is, the second measurement unit 20 includes a sample dispensing unit 351 for dispensing the sample accommodated in the first reaction container 91 into a second reaction container 92 which is different from the first reaction container 91. In this way the first measurement unit 10 and the second measurement unit 20 can perform measurement processes using separate reaction containers. Therefore, even when the amounts of the samples to be used and the types of the reaction containers are different between the first measurement unit 10 and the second measurement unit 20, it is possible to appropriately perform the respective sample measurement in separate reaction containers. Even when separate reaction containers are used, they are stored in the common disposal unit 50 after they are put in the first disposal port 11 and the second disposal port 21, so that the work burden of the user in disposing of the waste GB can be effectively reduced.

The reagent dispensing unit 352 suctions the reagent contained in the reagent container 301c in the reagent storage 301a, and dispenses the suctioned reagent into the second reaction container 92. In this way the reagent dispensing unit 352 can suction and dispense the reagent from the reagent container 301c. Note that the sample measuring system 100 includes a cleaning unit 362 that cleans the sample dispensing unit 351 and the reagent dispensing unit 352 using a cleaning liquid.

The spotting unit 361 can hold the second reaction container 92. The sample in the first reaction container 91 held in the sample supply unit 313 is dispensed by the dispensing unit 350 into the second reaction container 92 held by the spotting unit 361. The R1 reagent is dispensed by the dispensing unit 350 in the spotting unit 361.

The dispensing unit 350 moves the sample dispensing unit 351 and the reagent dispensing unit 352 to the lids 341a and 341b, the spotting unit 361, the cleaning unit 362, and the sample supply unit 313 as the suction position or discharge position. The lids 341a and 341b, the spotting unit 361, the cleaning unit 362, and the sample supply unit 313 are linearly arranged in plan view.

The heating unit 370 includes a heater and a temperature sensor, and holds the second reaction container 92 heats the sample contained in the second reaction container 92 to reaction. The heating unit 370 heats the second reaction container 92 in which the liquid has been dispensed. The heating unit 370 is provided with a plurality of holding holes 371. The second reaction container 92 can be installed one by one in each holding hole 371. The sample and the reagent contained in the second reaction container 92 are reacted by the heating of the heating unit 370. One or a plurality of heating units 370 are provided in the second measurement unit 20. The heating unit 370 may be fixedly installed in the second measurement unit 20 or may be provided movably in the second measurement unit 20. When the heating unit 370 is configured to be movable, the heating unit 370 may also function as a part of the reaction container transfer unit.

The reagent dispensing unit 380 is fluidly connected to the reagent container in the reagent storage 301b and dispenses the R4 reagent and the R5 reagent to the second reaction container 92. The reagent dispensing unit 380 includes an R4 reagent dispensing unit 381 and an R5 reagent dispensing unit 382. The R4 reagent dispensing unit 381 dispenses the R4 reagent to the second reaction container 92 transferred by the reaction container transfer unit 330. The R5 reagent dispensing unit 382 dispenses the R5 reagent to the second reaction container 92 transferred by the reaction container transfer unit 330.

The BF separation unit 390 has a function of executing a BF separation process for separating a liquid phase and a solid phase from the second reaction container 92. The BF separator 390 performs BF separation on the second reaction container 92 into which the liquid has been dispensed. The BF separator 390 includes one or a plurality of process ports capable of installing the second reaction container 92. A magnetic force source 392 (see FIG. 15) for magnetically collecting the magnetic particles contained in the R2 reagent and a cleaning unit 391 (see FIG. 15) for suctioning the liquid phase and supplying a cleaning liquid are provided at the process port. The BF separating unit 390 suctions the liquid phase in the second reaction container 92 and supplies cleaning liquid by the cleaning unit 391 in a state wherein the magnetic particles on which immunocomplexes are formed as described below are collected. The cleaning unit 391 includes a liquid phase suction passage and a cleaning liquid discharge passage, and is connected to a fluid circuit (not shown). In this way unnecessary components contained in the liquid phase can be separated and removed from the conjugate of the immunocomplex and magnetic particles.

The measurement unit 304 of the second measurement unit 20 has the same configuration as the measurement unit 42 shown in FIG. 9. The measurement unit 204 includes a container holding unit 42a that holds the second reaction container 92 that contains the sample, and a detection unit 42b that detects a signal based on the labeled substance bound to the target substance in the sample in the reaction container 90. The container holding unit 42a has a box shape in which the second reaction container 92 can be accommodated in a light shielded state. The detection unit 42b is configured by a photomultiplier tube or the like. The measurement unit 304 measures the amount of antigen contained in the sample by acquiring the light generated in the reaction process between the labeled antibody that binds to the antigen of the sample subjected to various treatments and the luminescent substrate by the detection unit 42b.

Outline of Immunoassay

Figure 15:
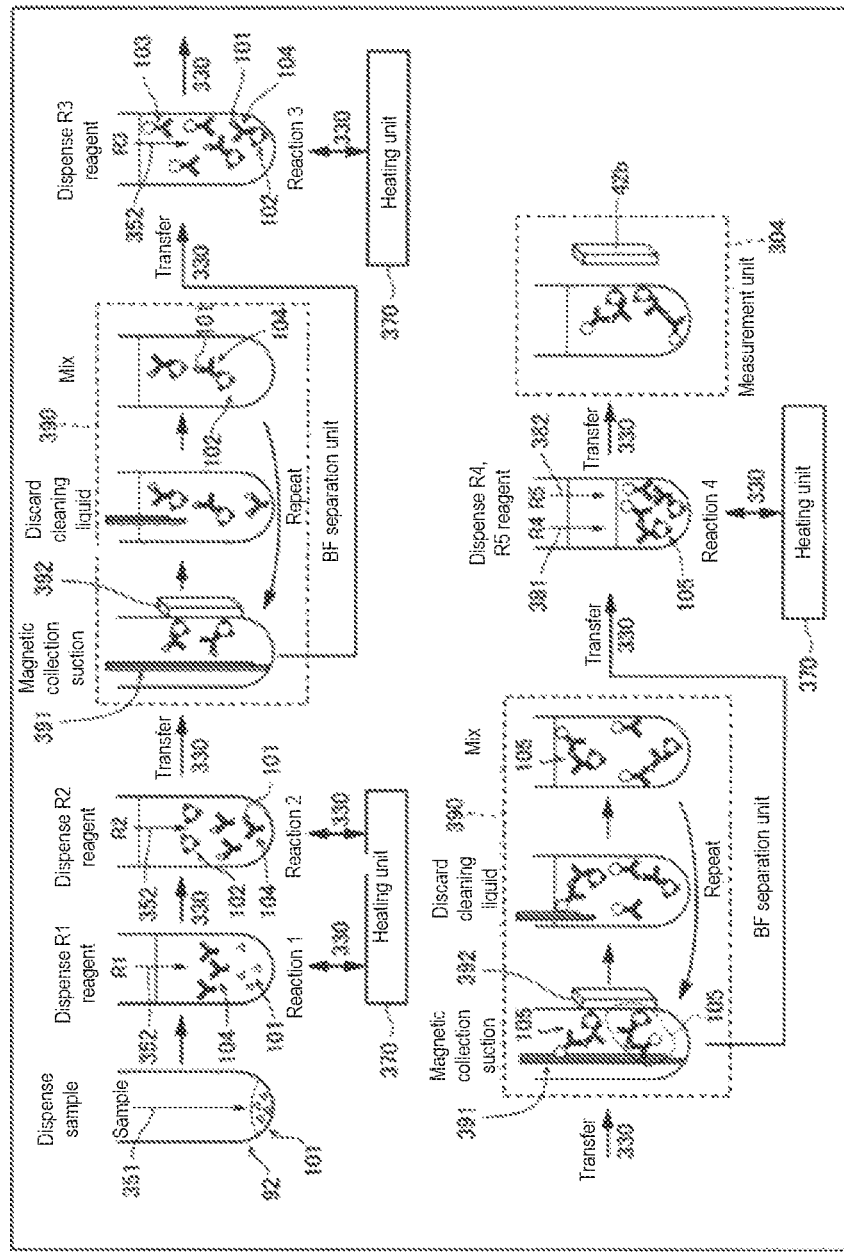
FIG. 15 is a diagram illustrating the measurement process of a second measurement unit.

In the structural example shown in FIG. 14, as described above, immunoassay is performed using R1 reagent to R5 reagent in the second measurement unit 20. Referring to FIG. 15, an example in which the target substance 101 is hepatitis B surface antigen (HBsAg) will be described below as an example of immunoassay.

First, the sample containing the target substance 101 and the R1 reagent are dispensed to the second reaction container 92. The sample is dispensed into the second reaction container 92 by the sample dispensing unit 351. The R1 reagent is dispensed into the second reaction container 92 by the reagent dispensing unit 352. The R1 reagent contains the capture substance 104 and reacts with and binds to the target substance 101. The capture substance 104 contains a binding substance for the capture substance 104 to bind to the solid phase carrier 102 contained in the R2 reagent.

A combination of biotin and avidin, hapten and antihapten antibody, nickel and histidine tag, glutathione and glutathione-S-transferase and the like can be used for binding the binding substance and the solid phase carrier. "Avidins" includes avidin and streptavidin.

For example, capture substance 104 is an antibody modified with biotin (biotin antibody). That is, biotin is modified in the capture substance 104 as a binding substance. After dispensing the sample and the R1 reagent, the sample in the second reaction container 92 is heated to a predetermined temperature in the heating unit 370, whereby the capture substance 104 and the target substance 101 are bound.

Next, the R2 reagent is dispensed into the second reaction container 92 by the reagent dispensing unit 352. The R2 reagent contains the solid phase carrier 102. The solid phase carrier 102 binds to the binding substance of the capture substance 104. The solid phase carrier 102 is, for example, magnetic particles (StAvi-binding magnetic particles) to which streptavidin binding to biotin is immobilized. Streptavidin of StAvi-binding magnetic particles reacts with biotin as a binding substance and binds. After dispensing the R2 reagent, the sample in the second reaction container 92 is heated to a predetermined temperature in the heating unit 370. As a result, the target substance 101 and the capture substance 104 are bound to the solid phase carrier 102.

The target substance 101 and the capture substance 104 formed on the solid phase carrier 102 and the unreacted capture substance 104 are separated by a primary BF separation process by the BF separation unit 390. When the second reaction container 92 is set in the process port of the BF separation unit 390, the BF separation unit 390 suctions the liquid phase by the cleaning unit 391 in the magnetism collection state by the magnetic power source 392, discharges the cleaning liquid, stirs in a magnetism collecting state; these steps are executed one or more times. Unreacted components such as unreacted capture substance 104 are removed from the second reaction container 92 by the primary BF separation process. In the primary BF separation process, the liquid phase in the second reaction container 92 is finally suctioned and the process proceeds to the next step.

Then, the reagent dispensing unit 352 dispenses the R3 reagent into the second reaction container 92. The R3 reagent contains the labeling substance 103 and reacts with the target substance 101 to bind. After dispensing the R3 reagent, the sample in the second reaction container 92 is heated to a predetermined temperature in the heating unit 370. As a result, an immune complex 105 including the target substance 101, the labeling substance 103, and the capture substance 104 is formed on the solid phase carrier 102. In the example of FIG. 15, the labeling substance 103 is an ALP (alkaline phosphatase)-labeled antibody.

The immune complex 105 formed on the solid phase carrier 102 and the unreacted labeling substance 103 are separated by the secondary BF separation process. The BF separation unit 390 executes each step of suction of the liquid phase in the magnetism collecting state by the magnetic force source 392, discharge of the cleaning liquid, and agitation in the non-magnetism state one or more times. Unreacted components such as unreacted labeling substance 103 are removed from the second reaction container 92 by the secondary BF separation process. In the secondary BF separation process, the process proceeds to the next step in the state in which the liquid phase in the second reaction container 92 is finally suctioned.

Thereafter, the R4 reagent and the R5 reagent are dispensed to the second reaction container 92 by each of the R4 reagent dispensing unit 381 and the R5 reagent dispensing unit 382. The R4 reagent contains a buffer solution. The immune complex 105 bound to the solid phase carrier 102 is dispersed in the buffer solution. The R5 reagent contains a chemiluminescent substrate. The buffer solution contained in the R4 reagent has a composition that promotes a reaction between the label (enzyme) of the labeling substance 103 contained in the immunocomplex 105 and the substrate. After dispensing the R4 and R5 reagents, the sample in the second reaction container 92 is heated to a predetermined temperature in the heating unit 370. Light is generated by causing the substrate to react with the label, and the intensity of the generated light is measured by the detection unit 42b of the measurement unit 304. The content of the target substance 101 in the sample and the like are analyzed based on the detection signal of the measurement unit 304.

Disposal Unit

Figure 16:
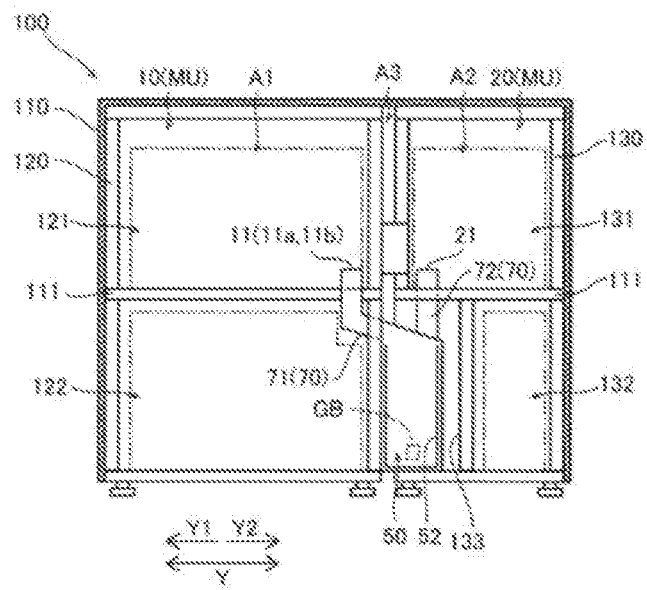
FIG. 16 is a schematic diagram showing the structures of a first measurement unit and a second measurement unit.
Figure 17:
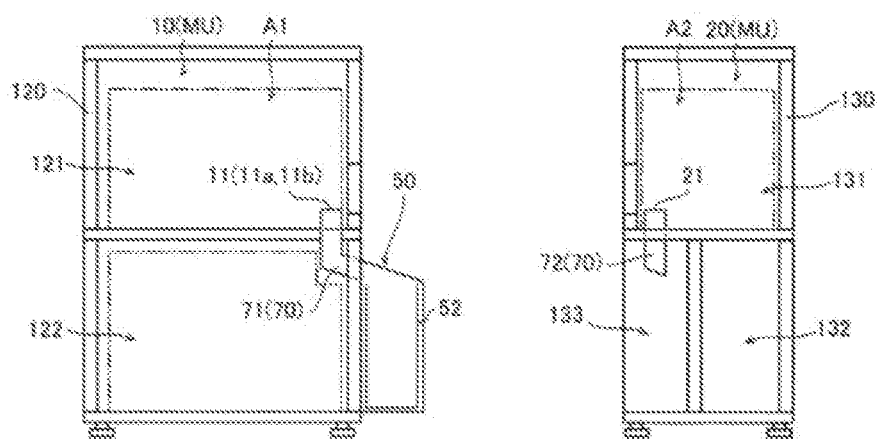
FIG. 17 is a schematic diagram showing a state in which a first frame and a second frame are separated.
Figure 18:
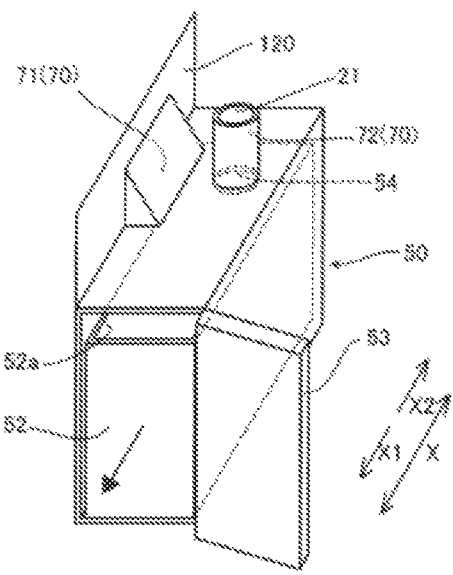
FIG. 18 is a perspective view showing a disposal unit in the structural example of FIG. 11.

FIG. 16 to FIG. 18 are diagrams showing the disposal unit 50 in a specific structural example of the sample measuring system 100 shown in FIG. 11 to FIG. 14. The disposal unit 50 is provided below the first measurement unit 10 and the second measurement unit 20 in the housing 110 in which the first measurement unit 10 and the second measurement unit 20 are disposed.

Specifically, the sample measuring system 100 includes a first frame 120 provided with a first measurement unit 10, a second frame 130 provided with a second measurement unit 20, and a housing 110 that houses the first frame 120 and the second frame 130. The first frame 120 and the second frame 130 are arranged side by side in the lateral direction (Y direction) so as to form the intermediate area A3 therebetween. In this way the first measurement unit 10 and the second measurement unit 20 can be separately provided in separate frames. Therefore, the sample measuring system 100 is basically configured as a device having the first measurement unit 10 and the disposal unit 50 in the first frame 120, and the second frame 130 provided with the second measurement unit 20 is added to the basic configuration in an extended configuration. In this way it is possible to configure the sample measuring system 100 capable of freely changing the device configuration.

The first frame 120 and the second frame 130 have a hierarchical structure in which a plurality of installation areas are arranged vertically. In FIG. 16, the first frame 120 and the second frame 130 have a hierarchical structure of two upper and lower layers separated by the partition plate 111. A first area A1 in which the first measurement unit 10 is disposed is provided in the upper stage 121 of the first frame 120. The lower stage 122 of the first frame 120 is provided with a pressure source and a fluid circuit for supplying pressure to the first measurement unit 10, a control unit of the first measurement unit 10 and the like. A second area A2 in which the second measurement unit 20 is arranged is provided in the upper stage 131 of the second frame 130. The lower stage 132 of the second frame 130 is provided with a pressure source and a fluid circuit for supplying pressure to the second measurement unit 20, a control unit of the second measurement unit 20 and the like.

The disposal unit 50 is provided on a side surface of the first frame 120 on the side of the second frame 130. The second frame 130 also has a concavity 133 for arranging the disposal unit 50 on the side surface on the side of the first frame 120. That is, the disposal unit 50 is provided so as to project into the concavity 133 of the second frame 130 in the first frame 120. In the case where the first frame 120 and the second frame 130 are separated as shown in FIG. 17, the disposal unit 50 is fixed to the side surface of the first frame 120, and functions as a dedicated disposal unit 50 to the first measurement unit 10. In this way the disposal unit 50 of the first frame 120 can be accommodated in the concavity 133 of the second frame 130 as is and can be configured as a disposal unit 50 common to the first measurement unit 10 and the second measurement unit 20 by arranging the second frame 130 side by side on the side face of the first frame 120 even when the first measurement unit 10 as a basic configuration is provided with an extended configuration in which the second measurement unit 20 is also provided. In the example of FIG. 17, when the sample measuring system 100 is not configured, the first measurement unit 10 alone constitutes the device by accommodating only the configuration on the left side in the figure having the first frame 120 and the disposal part 50 in the housing.

The first disposal port 11 of the first measurement unit 10 passes through the partition plate 111 from the upper stage 121 and opens to the lower stage 122 side. The lower stage 122 and the disposal unit 50 are connected by the inclined first chute unit 71. In this way the waste GB discharged into the first disposal port 11 passes through the first chute unit 71 by the action of gravity and is transported to the disposal unit 50.

The second disposal port 21 of the second measurement unit 20 passes through the partition plate 111 from the upper stage 131 and opens into the recess 133 on the lower stage 132 side. The lower stage 132 and the disposal unit 50 are connected by the second chute unit 72 in the vertical direction. In this way the waste matter GB discharged into the second disposal port 21 passes through the second chute unit 72 by the action of gravity and is transported to the disposal unit 50.

In the example of FIG. 18, the disposal unit 50 includes a disposal box 52 configured to be capable of being removed from the housing 110. That is, the disposal unit 50 is configured as a housing of the disposal box 52 having the internal space in which the disposal box 52 is installed. In this way the user can easily remove the stored waste GB from the disposal unit 50 simply by pulling out the disposal box 52 from the housing 110. As a result, it is possible to easily perform the task of disposing of the waste GB.

The disposal unit 50 has a connection opening 54 for receiving the waste GB discarded from the second disposal port 21 into the disposal box 52. The connection opening 54 is provided so as to penetrate from the upper surface of the disposal unit 50 to the internal space where the disposal box 52 is arranged, and is disposed at a position immediately below the lower end portion of the second chute unit 72. The waste GB discarded from the second disposal port 21 passes through the second chute unit 72 and the connection opening 54 and is put into the disposal box 52. In this way the waste GB from the second disposal port 21 of the second measurement unit 20 which has been added can be accommodated in the disposal box 52 just by providing the connection opening 54 in the disposal unit 50 even when the sample measuring system 100 has an expanded configuration in which the second measurement unit 20 is added to the first measurement unit 10 having the disposal unit 50. Therefore, in the sample measuring system 100 that can freely expand and change the device configuration, it is possible to easily construct a configuration in which the disposal unit 50 is shared.

The disposal unit 50 is provided so as to extend in the depth direction of the housing 110 from the front surface to the rear surface side of the housing 110. In this way the user can access the disposal box 52 from the front side of the housing 110, so that the disposal box 52 can be easily put in and taken out. In FIG. 18, the disposal box 52 is a box having a rectangular parallelepiped shape with its upper part opened. The waste box 52 receives the waste GB transferred from the first chute unit 71 and the second chute unit 72, respectively, from the upper opening 52a and stores the waste GB therein. On the front face of the disposal unit 50, a door 53 that can be opened and closed is provided. The user opens the door 53 and pulls out the disposal box 52 from the front side of the sample measuring system 100 and collects and discards the stored waste GB.

Figure 19:
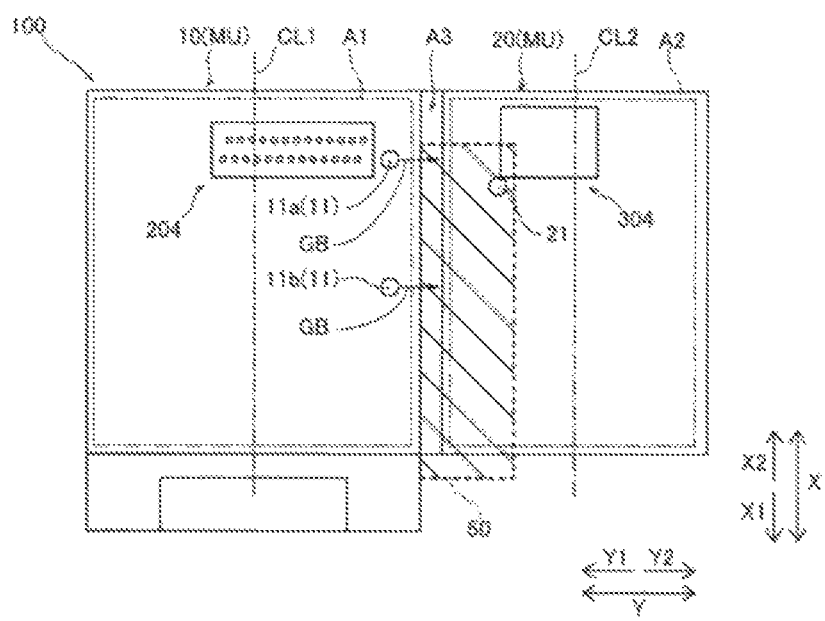
FIG. 19 is a plan view showing the positions of the disposal unit and the disposal port in the structural example of FIG. 11.

In the example shown in FIG. 19, the disposal unit 50 extends to the position on the back side of the housing 110 among the first disposal port 11 and the second disposal port 21 in the depth direction (X direction). In the example of FIG. 19, among the two first disposal ports 11a and 11b and one second disposal port 21, the first disposal port 11a is arranged at the innermost side (the X2 direction side). The disposal unit 50 is provided so as to extend further to the back side position beyond the position of the farthest first disposal port 11a. In this way the disposal unit 50 is provided so as to reach the position where the first disposal port 11 and the second disposal port 21 are disposed from the front face of the housing 110, so that the distance from the first disposal port 11 and the second disposal port 21 to the disposal unit 50 can be shortened. As a result, it is possible to simplify the device configuration and suppress occurrence of jamming of the waste GB since the route of transporting the waste GB from the first disposal port 11 and the second disposal port 21 to the disposal unit 50 can be shortened.

In FIG. 19, the disposal unit 50 also is arranged at a position closer to the first measurement unit 10 than the center in the second measurement unit 20 in plan view. That is, the disposal unit 50 is arranged at a position on the Y1 direction side of the first measurement unit 10 from the center line CL2, which divides the width of the second measuring unit 20 in the Y direction in which the first measurement unit 10 and the second measurement unit 20 are aligned. Specifically, the disposal unit 50 is provided across the intermediate area A3 from the side surface of the first measurement unit 10 to the position on the first measurement unit 10 side in the second measurement unit 20. The disposal unit 50 is disposed so as to be contained between the side surface of the first measurement unit 10 on the second measurement unit 20 side and the center line CL2 of the second measurement unit 20. In this way the disposal unit 50 can be disposed at a position closer to either the first measurement unit 10 or the second measurement unit 20. As a result, it is possible to effectively shorten the route of transporting the waste GB from the first disposal port 11 and the second disposal port 21 to the disposal unit 50.

Figure 20:
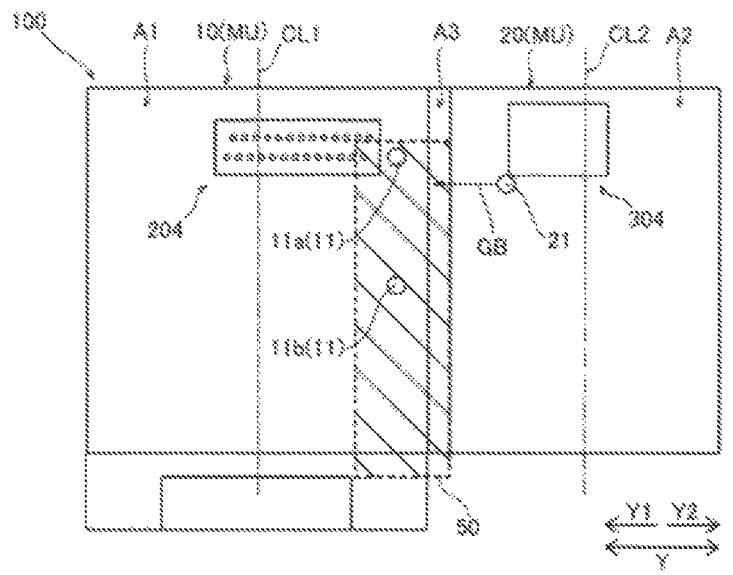
FIG. 20 is a plan view showing a modified example of the arrangement position of the disposal unit.

As shown in FIG. 20, the disposal unit 50 also may be arranged at a position closer to the second measurement unit 20 than the center in the first measurement unit 10 in a plan view. For example, the disposal unit 50 may be provided on the side surface of the second frame 130 on the side of the first frame 120 illustrated in FIG. 17, and the concavity 133 may be provided on the second frame 130 side of the first frame 120. In FIG. 20, the disposal unit 50 is arranged at a position on the Y2 direction side of the second measurement unit 20 from the center line C1 that bisects the width of the first measurement unit 10 in the Y direction in which the first measurement unit 10 and the second measurement unit 20 are aligned. The disposal unit 50 is provided across the intermediate area A3 from the side surface of the second measurement unit 20 to the position of the first measurement unit 10 on the second measurement unit 20 side. The disposal unit 50 is arranged so as to be contained between the side surface of the second measurement unit 20 on the first measurement unit 10 side and the center line CL1 of the first measurement unit 10. The disposal unit 50 can also be arranged at a position closer to either the first measurement unit 10 or the second measurement unit 20 by doing so.

In the example of FIGS. 19 and 20, the first disposal port 11 is arranged at a position closer to the second measurement unit 20 than the center of the first measurement unit 10 in plan view. In other words, the first waste port 11 is arranged such that the second measurement unit 20 is located at a position on the Y2 direction side of the second measurement unit 20 from the center line CL1 that bisects the width of the first measurement unit 10 in the Y direction in which the first measurement unit 10 and the second measurement unit 20 are aligned. The second disposal port 21 also is disposed at a position closer to the first measurement unit 10 than the center of the second measurement unit 20 in a plan view. The second disposal port 21 is arranged at a position on the Y1 direction side of the first measurement unit 10 from the center line CL2 that bisects the width of the second measurement unit 20 in the Y direction in which the first measurement unit 10 and the second measurement unit 20 are aligned. In this way the first disposal port 11 and the second disposal port 21 can be disposed at positions close to the disposal unit 50 in each measurement unit. As a result, it is possible to more effectively shorten the route of transporting the waste GB from the first disposal port 11 and the second disposal port 21 to the disposal unit 50.

Figure 21:
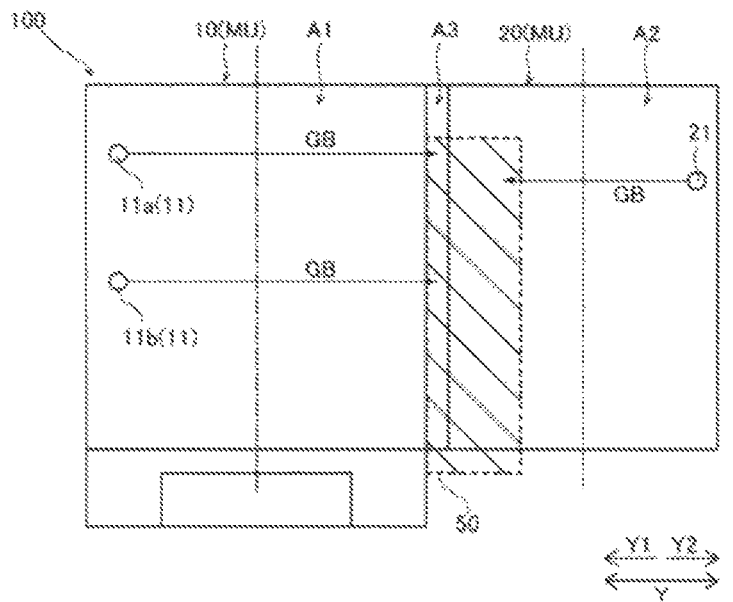
FIG. 21 is a plan view showing a modified example of the arrangement position of the disposal port.

As shown in FIG. 21, the first disposal port 11 also may be disposed at a position opposite to the second measurement unit 20 and the second disposal port 21 may be disposed at a position opposite to the first measurement unit 10. However, the transport distance of the waste GB from the first disposal port 11 and the second disposal port 21 to the disposal unit 50 increases as can be seen from comparison with FIG. 19 and FIG. 20. Therefore, it is preferable to dispose the first disposal port 11 at the position on the second measurement unit 20 side and dispose the second disposal port 21 at a position on the first measurement unit 10 side.

More specifically, in the example shown in FIG. 12, the first disposal ports 11*a* and 11*b* of the first measurement unit 10 are both located at positions adjacent to the intermediate area A3 which is the boundary between the first measurement unit 10 and the second measurement unit 20, respectively. In other words, units such as the sample dispensing units 212 and 213 and the reagent dispensing units 242 and 243 are not provided between the first disposal ports 11*a* and 11*b* and the intermediate area A3, and the first disposal ports 11*a* and 11*b* are disposed in the vicinity of the intermediate area A3. The first disposal ports 11*a* and 11*b* are disposed at positions between the measurement unit 204 and the intermediate area A3 in the Y direction. That is, the first disposal ports 11*a* and 11*b* are arranged in the first measurement unit 10 on the second measurement unit 20 side of the first measurement unit 10.

In the example shown in FIG. 14, the second disposal port 21 of the second measurement unit 20 is provided at a position adjacent to the intermediate area A3 which is the boundary between the first measurement unit 10 and the second measurement unit 20. In other words, units such as the dispensing unit 350 and the heating unit 370 are not provided between the second disposal port 21 and the intermediate area A3, and the second disposal port 21 is provided in the vicinity of the intermediate area A3. The second disposal port 21 also is disposed at a position between the measurement unit 304 and the intermediate area A3 in the Y direction. That is, the second disposal port 21 is disposed in the second measurement unit 20 at a position closer to the first measurement unit 10 than the measurement unit 304 of the second measurement unit 20. Therefore, as can be seen from FIG. 19, the distance between the first disposal port 11 and the second disposal port 21 in the Y direction in which the first measurement unit 10 and the second measurement unit 20 are arranged is equal to the distance between the measurement unit 204 and the measurement unit 304.

Figure 22:
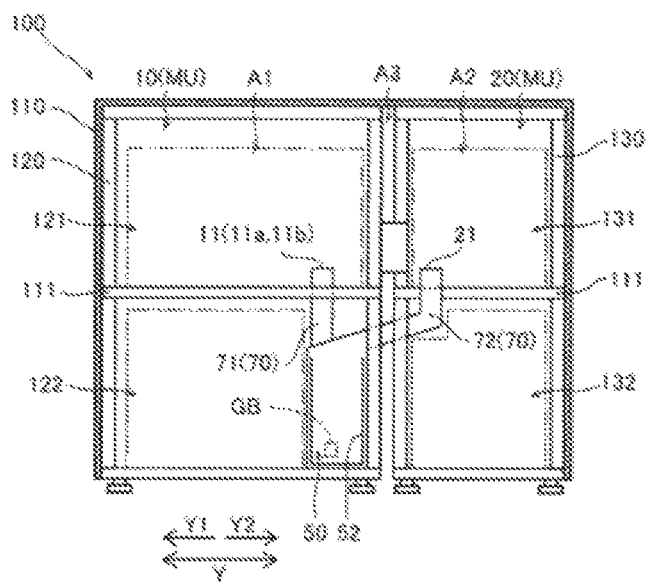
FIG. 22 is a schematic diagram showing another structural example including a first frame and a second frame.
Figure 23:
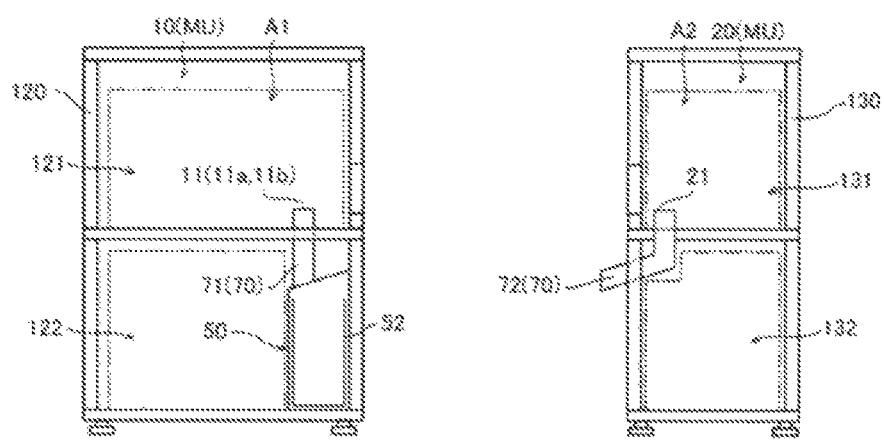
FIG. 23 is a schematic diagram in which the first frame and the second frame in FIG. 22 are separated.

In the example shown in FIGS. 22 and 23, the disposal unit 50 is provided inside the first frame 120. That is, unlike the examples shown in FIGS. 16 and 17, the disposal unit 50 is provided at a position where it can fit inside the first frame 120 without protruding from the first frame 120. The disposal unit 50 is provided inside the first frame 120 at a position on the side of the second frame 130. The first disposal port 11 of the first measurement unit 10 is connected to the disposal unit 50 by a first linear chute unit 71 extending vertically.

In the examples of FIGS. 22 and 23, the second frame 130 is not provided with the concavity 133. The second disposal port 21 of the second measurement unit 20 is connected to the inside of the disposal unit 50 by a second chute unit 72 which is inclined obliquely so as to extend from the second frame 130 to the inside of the first frame 120.

Even in this case when the first frame 120 and the second frame 130 are separated as shown in FIG. 23. The disposal unit 50 can also function as a dedicated disposal unit 50 of the first measurement unit 10 in a state of being arranged inside the first frame 120. Therefore, it is possible to easily realize the sample measuring system 100 having the shared disposal unit 50 even in the case of an expanded configuration in which the second frame 130 provided with the second measuring unit 20 relative to a device provided with a first measurement unit 10 and a disposal unit 50 in the first frame 120.

Controlling Configuration of Sample Measuring System

Next, a controlling configuration of the sample measuring system 100 will be described with reference to FIGS. 24 and 25.

Figure 24:
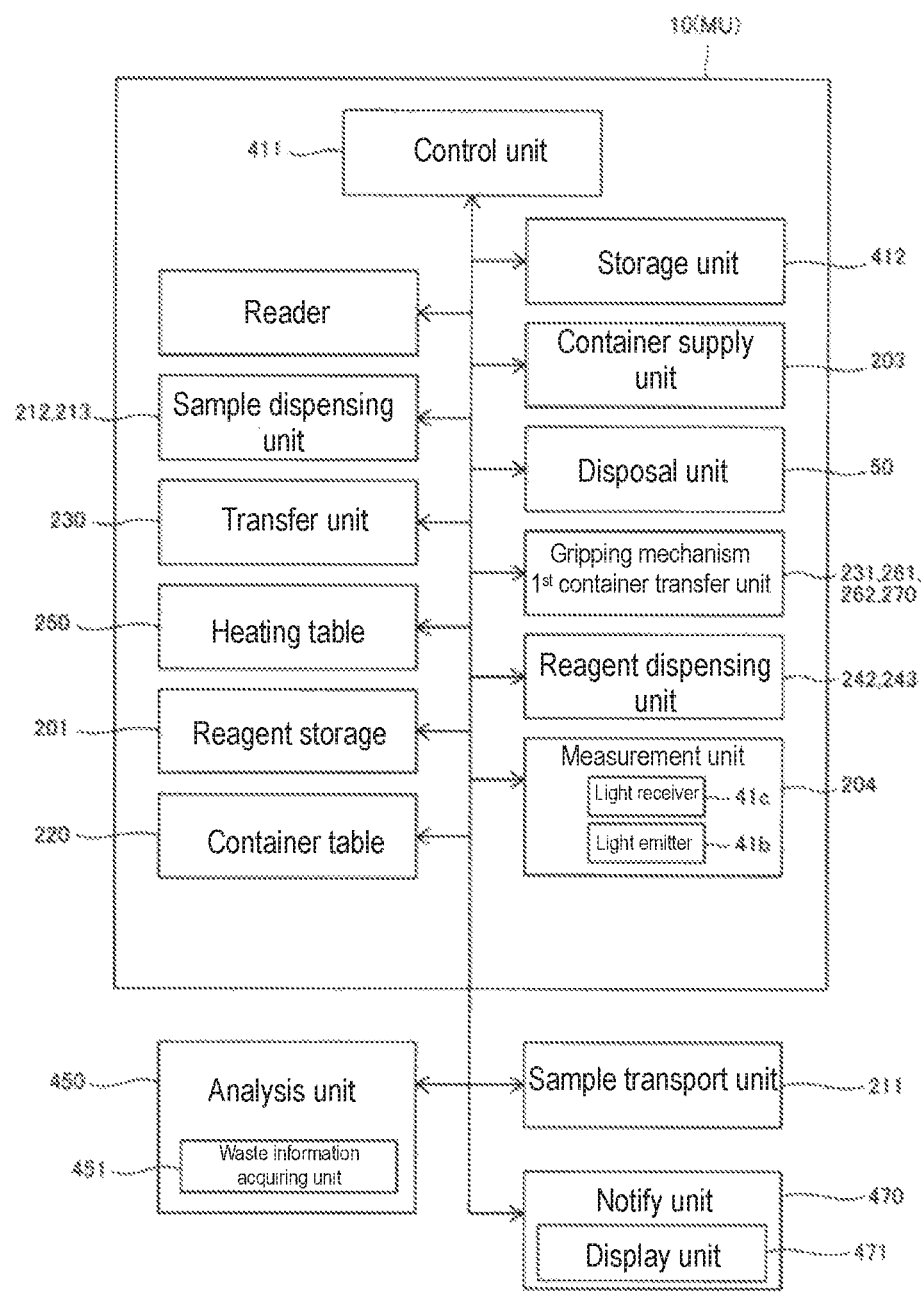
FIG. 24 is a block diagram showing a control structure of a first measurement unit.
Figure 25:
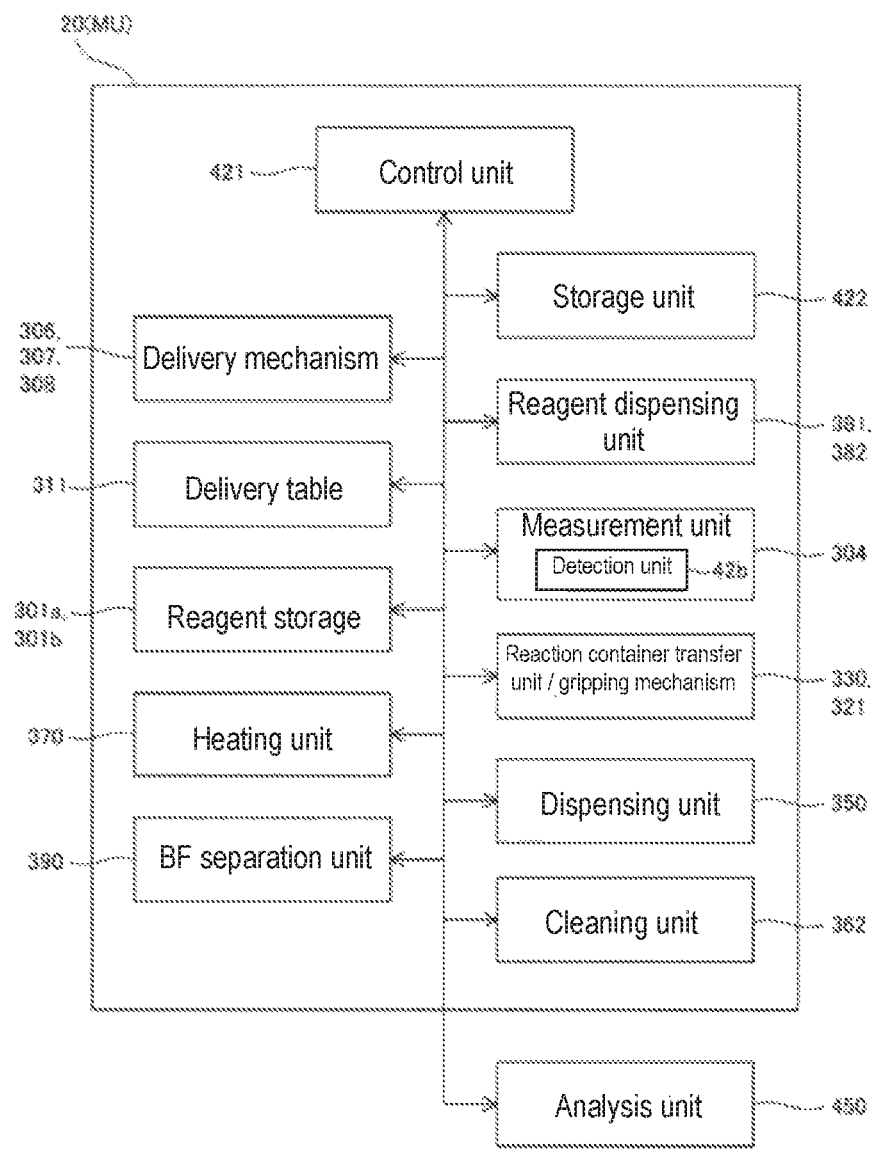
FIG. 25 is a block diagram showing a control structure of a second measurement unit.

As shown in FIGS. 24 and 25, the first measurement unit 10 includes a control unit 411 and a storage unit 412. The second measurement unit 20 includes a control unit 421 and a storage unit 422.

The control units 411 and 421 each include a processor such as a CPU or an FPGA. The storage units 412 and 422 include volatile and/or nonvolatile storage devices such as ROM, RAM and hard disk, respectively. The processor functions as a control unit of each measurement unit MU by executing a control program stored in the storage unit. The control unit 411 controls the operation of each unit of the above-described first measurement unit 10. The control unit 421 controls the operation of each unit of the above-described second measurement unit 20.

The sample measuring system 100 includes an analysis unit 450 and a notifying unit 470 (see FIG. 24). The analysis unit 450 is configured by, for example, a personal computer. The analysis unit 450 is configured to include, for example, a processor such as a CPU and a storage device such as a ROM, a RAM, and a hard disk. The processor functions as the analysis unit 450 of the sample measuring system 100 by executing the control program stored in the storage unit. The notifying unit 470 notifies the user of various kinds of information. The notifying unit 470 includes, for example, a display unit 471, a speaker, an indicator lamp, a communication unit that notifies information by communication, and the like.

The analysis unit 450 is electrically connected to the control unit 411 of the first measurement unit 10, and the control unit 421 of the second measurement unit 20, and controls each measurement unit MU. The analysis unit 450 also analyzes the measurement results of each measurement unit MU. The analysis unit 450 is connected to a host computer (not shown) via a network, and acquires a measurement order for each measurement unit MU from the host computer. The analysis unit 450 controls the first measurement unit 10 and the second measurement unit 20 so as to sequentially execute the acquired measurement orders.

Detection of Waste

Figure 26:
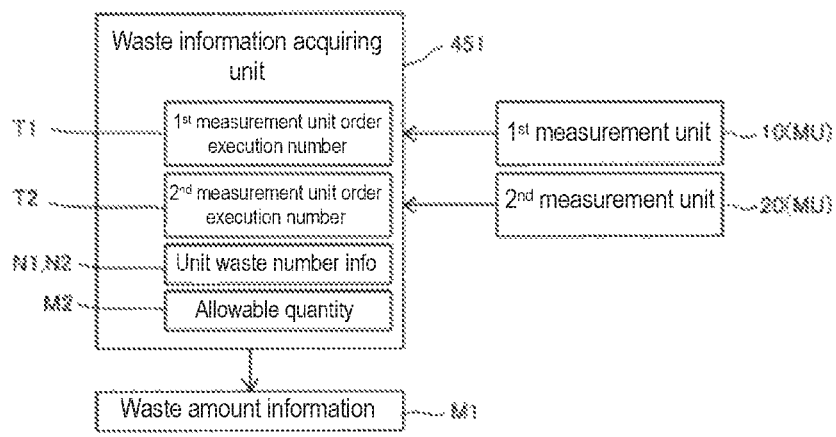
FIG. 26 is a diagram illustrating a waste information acquiring unit.

In the structural example of FIG. 26, the sample measuring system 100 includes a waste information acquiring unit 451 that acquires information on the amount of the waste GB stored in the disposal unit 50. The notifying unit 470 is configured to notify information on the amount of the waste GB acquired by the waste information acquiring unit 451. In this way the user can grasp the amount of the waste GB stored in the disposal unit 50 via the notifying unit 470. Therefore, even when the waste GB generated in each of the first measurement unit 10 and the second measurement unit 20 is discarded to the common disposal unit 50, the user can easily recognize whether it is necessary to dispose of the waste GB stored in the disposal unit 50.

In the structural example of FIG. 26, the processor of the analysis unit 450 executes a program, thereby also functioning as a waste information acquiring unit 451. A dedicated processor for the waste information acquiring unit 451 also may be provided.

In the example shown in FIG. 26, the waste information acquiring unit 451 acquires information on the amount of waste GB based on the total value of the number of times of execution of measurement orders in each of the first measurement unit 10 and the second measurement unit 20. That is, if the number of executions of measurement orders in each measurement unit is known, the total amount of waste GB discharged to the disposal unit 50 can be known since the amount of waste GB generated in one measurement is predetermined. In this way, even if the waste GB discarded from the first disposal port 11 and the second disposal port 21 is not directly detected one by one by a sensor or the like, information on the amount of the waste GB from the operation information of each measurement unit can be easily obtained.

The waste information acquiring unit 451 acquires the execution status of the measurement order from the control unit 411 of the first measurement unit 10 and the control unit 421 of the second measurement unit 20, respectively. The waste information acquiring unit 451 counts the number of executions of the measurement order in each of the first measurement unit 10 and the second measurement unit 20 at the time of starting the count of the waste GB or from the previous reset time to the present. The waste information acquiring unit 451 increments the number of executions of the measurement order once when one measurement order is executed in each measurement unit MU. Since the operations of the first measurement unit 10 and the second measurement unit 20 are predetermined sequence operations, any operation included in the sequence operation, such as dispensing of a sample, may be counted as the number of executions of the measurement order.

It is assumed that N1 pieces of waste GB are discharged in the first measuring unit 10, and N2 pieces of the waste GB are discharged in the second measuring unit 20 when one measurement order is executed. Assuming that the number of times of execution of the measurement order in each of the first measurement unit 10 and the second measurement unit 20 is T1 and T2, the total amount M1 of waste GB can be expressed as $M1=(N1 \times T1)+(N2 \times T2)$. The waste information acquiring unit 451 acquires the total amount M1 of the waste GB as information on the amount of the waste GB.

Figure 27:
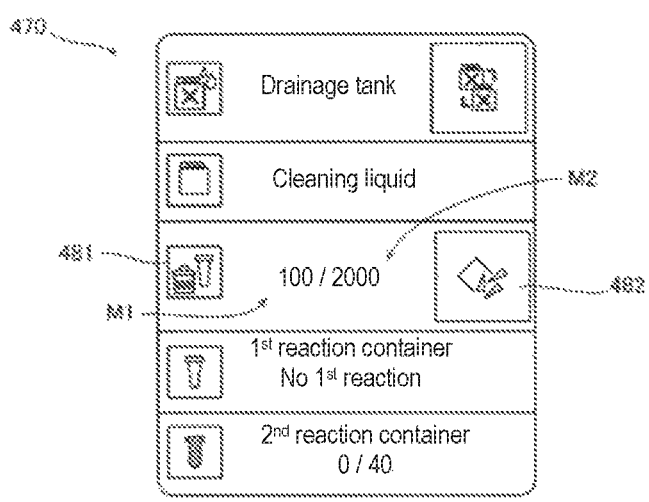
FIG. 27 is a diagram showing a display example of information on the amount of waste.

As shown in FIG. 27, when the notifying unit 470 includes a display unit 471 that displays a screen, the waste information acquiring unit 451 causes the notifying unit 470 to display information on the amount of the waste GB. In the waste information acquiring unit 451, information on an allowable quantity M2 of waste GB storable in the disposal unit 50 is set in advance. The waste information acquiring unit 451 causes the notifying unit 470 to display the total amount M1 of the waste GB currently stored and the allowable quantity M2 of the waste GB as information on the amount of the waste GB.

Note that FIG. 27 shows an example in which information on expendable items other than information on the amount of waste GB is also displayed on the display unit 471 as the notifying unit 470. In FIG. 27, the remaining amount information of the drainage tank, the remaining amount information of the cleaning water, and the remaining amount information of the first reaction container 91 and the second reaction container 92 are displayed together with the information on the amount of the waste GB.

In the example of FIG. 27, when the amount of the waste GB is equal to or larger than the predetermined amount, the notifying unit 470 notifies of the fact. In this way even when the user fails to confirm the amount of the waste GB, it is possible to reliably recognize that the user needs to take out and dispose of the waste GB stored in the disposal unit 50.

Specifically, the waste information acquiring unit 451 is configured to change the notification mode by the notifying unit 470 according to the amount of the waste GB. That is, in the example of FIG. 28, the display mode is changed stepwise according to the amount of the waste GB. Specifically, the display mode of the icon 481 indicating the waste GB is changed. As shown in FIG. 28A, when the total amount M1 of the waste GB is less than a threshold value, the icon 481 is displayed in a first display color indicating that it is in the first level normal state. As shown in FIG. 28B, when the total amount M1 of the waste GB is equal to or more than the threshold value and less than the allowable quantity M2, the icon 481 is displayed in a second display color. The second display color indicates that it is the second level that recommends the collection of the waste GB from the disposal unit 50 to the user. As shown in FIG. 28C, when the total amount M1 of the wastes GB is equal to or more than the allowable quantity M2, the icon 481 is displayed in a third display color. The third display color indicates that the user is warned that it is at the third level which can be an error factor such as an abnormal stop unless the waste GB is collected. Preferably, the first display color, the second display color, and the third display color make it possible for the user to intuitively recognize that the alert level rises with the progression of the steps. The first display color, the second display color, and the third display color are, for example, gray, yellow, red.

As will be described later, the waste information acquiring unit 451 may cause the notifying unit 470 to display a message (see FIG. 30) at the second level or higher. The notification when the amount of the waste GB is equal to or greater than a predetermined value may be made, for example, by sound output by a speaker, lighting of an indicator lamp, transmission of a message, or the like.

Note that in the examples of FIGS. 27 and 28 the waste information acquiring unit 451 displays a reset icon 482. When the reset icon 482 is input, the waste information acquiring unit 451 causes the display unit 471 to display a dialog 483 for selecting whether to reset the information on the amount of the waste GB as shown in FIG. 29. When the Yes button 483a of the dialog 483 is input, the waste information acquiring unit 451 resets the count of the total amount M1 of the waste GB to zero, and when the No button 483b of the dialog 483 is input, the total of the waste GB maintains the count of quantity M1. Note that opening and closing of the door 53 (FIG. 18) of the disposal unit 50 may be detected and the dialog 483 may be displayed. Since it can be presumed that the collection work of the waste GB is performed when the user opens the door 53, the waste information acquiring unit 451 displays the dialog 483 when it is detected that the door portion 53 is closed after the door portion 53 is opened.

Figure 30:
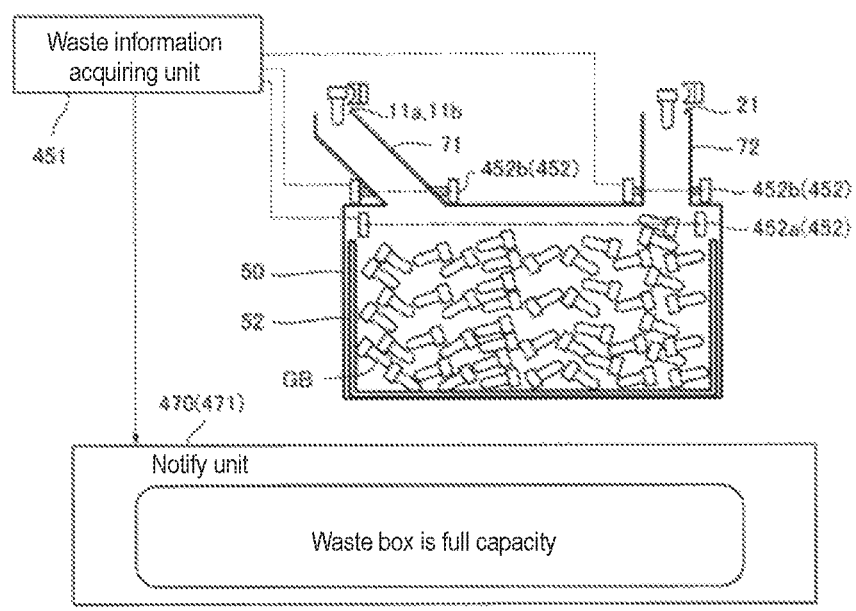
FIG. 30 is a view showing an example in which a waste sensor is provided in the disposal unit.

A sensor for detecting the waste GB also may be provided in the disposal unit 50. In the example of FIG. 30, the disposal unit 50 includes a waste sensor 452 for detecting the waste GB stored in the disposal unit 50. The waste information acquiring unit 451 acquires information on the amount of the waste GB based on the detection signal of the waste sensor 452.

In this way the amount of waste GB can be detected by the waste sensor 452. When a large amount of waste GB is stored in the disposal unit 50, depending on how the waste GB is stacked, there may be cases where the volume becomes equal to or greater than expected, or it is densely packed and more waste GB than expected is stored. Therefore, for example, in the case where the waste GB actually stored in the disposal unit 50 is directly detected by the waste sensor 452, whether it is necessary to dispose of the waste GB reserved in the disposal unit 50 can be recognized.

In the example of FIG. 30, the waste sensor 452 is an optical sensor including a light emitting unit and a light receiving unit, and detects the presence of the waste GB when light is blocked by the waste GB. The waste sensor 452 is provided at a plurality of locations of the disposal unit 50. Specifically, a first stage waste sensor 452a is provided in the vicinity of the upper end portion of the disposal box 52, and a second stage waste sensor 452b is provided at a position above the waste sensor 452a near the outlet openings of the first chute unit 71 and the second chute unit 72. The waste sensor 452a of the first stage detects that the disposal box 52 is full, the second stage waste sensor 452b detects abnormal conditions caused by jamming of waste GB in the first chute unit 71 or the second chute unit 72.

For example, when the first stage waste sensor 452a detects the waste GB and the second stage waste sensor 452b does not detect the waste GB, the waste information acquiring unit 451 displays a message indicating the full state of the disposal box 52. For example, when the waste GB is detected by both the first stage waste sensor 452a and the second stage waste sensor 452b, the waste information acquiring unit 451 stops the measurement unit MU as an error stop, and notifies the notifying unit 470 to display an error stop message (not shown).

Description of Measurement Process Operation

Next, the measurement process operation of the sample measuring system 100 shown in FIGS. 11 to 25 will be described with reference to FIGS. 31 to 35.

Figure 31:
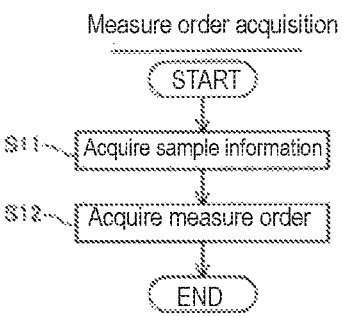
FIG. 31 is a flowchart illustrating a process of acquiring a measurement order by an analyzer.

FIG. 31 shows the process of acquiring the measurement order by the analysis unit 450.

In step S11, when the identification information is read from the sample container 95 by the sample transport unit 211, the analysis unit 450 acquires the identification information from the control unit 411. In step S12, the analysis unit 450 transmits the acquired identification information to the host computer, and receives the measurement order associated with the sample accommodated in the sample container 95. The measurement order includes at least one measurement item by the first measurement unit 10 and measurement item by the second measurement unit 20.

Measurement Process of First Measurement Unit

Figure 32:
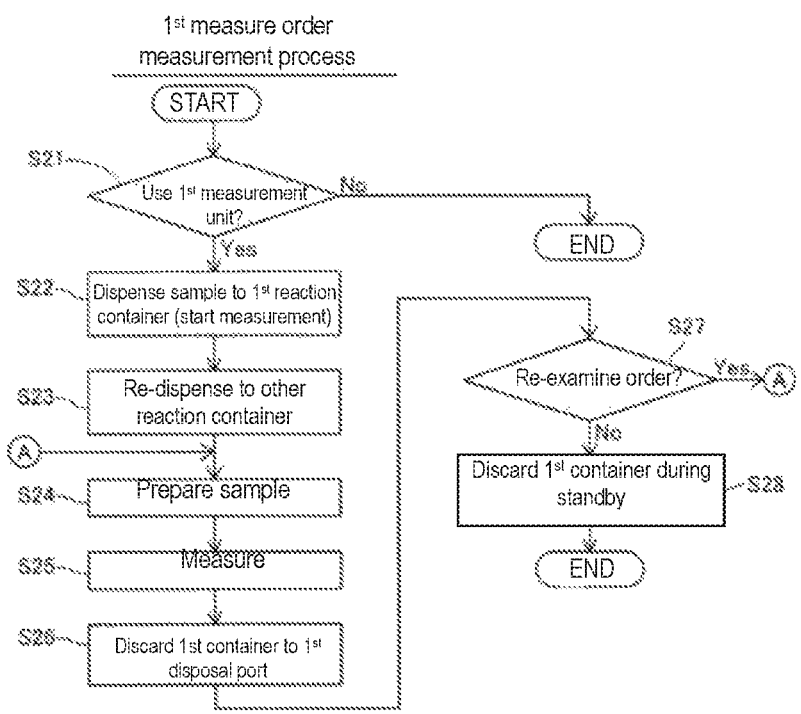
FIG. 32 is a flowchart illustrating a measurement process of the first measurement unit.

FIG. 32 shows a measurement process of the first measurement unit 10. The process of each step shown in FIG. 32 is executed by the control unit 411 of the first measurement unit 10. For each part of the first measurement unit 10, refer to FIG. 12.

In step S21, the control unit 411 determines whether to perform the measurement by the first measurement unit 10. That is, when the measurement order acquired by the analysis unit 450 includes a measurement item by the first measurement unit 10, the control unit 411 advances the process to step S22. When the measurement order does not include a measurement item by the first measurement unit 10, the measurement by the first measurement unit 10 is not executed on the sample.

Figure 35:
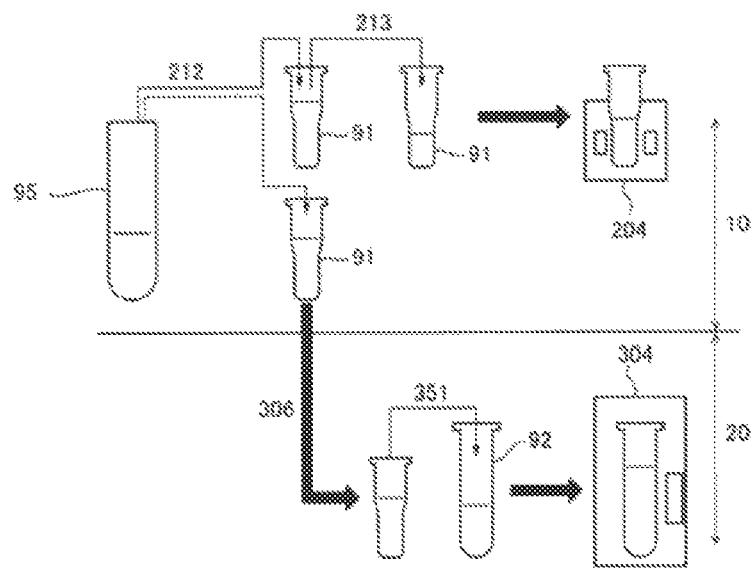
FIG. 35 is a view illustrating a dispensing operation to each reaction container.
Figure 36:
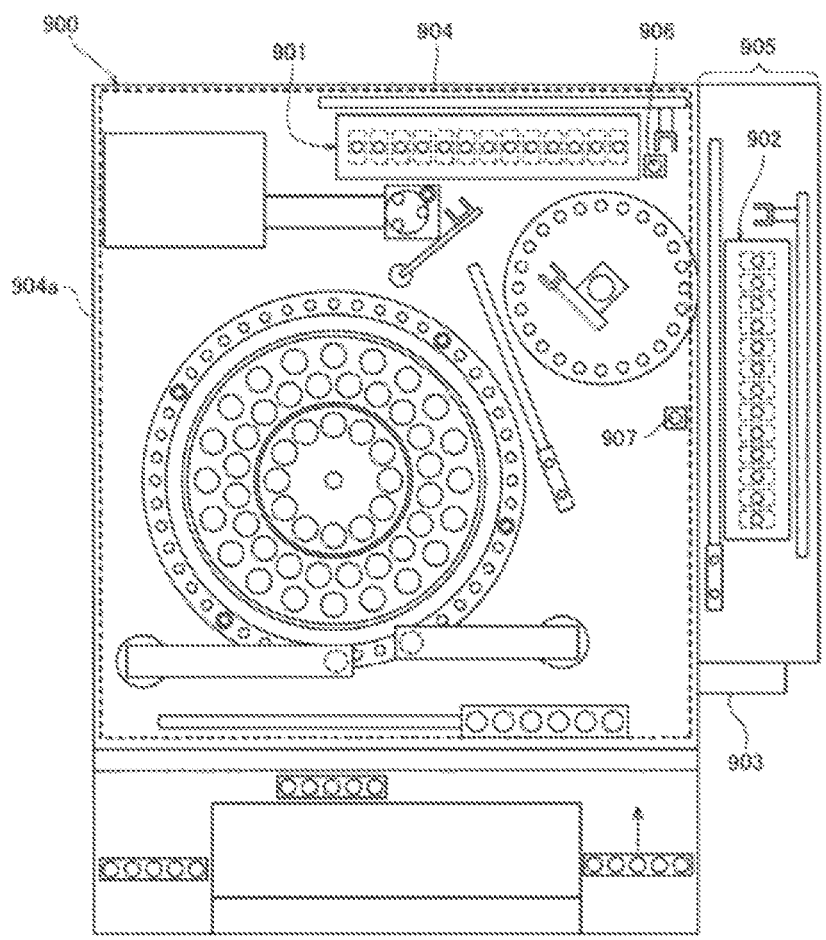
FIG. 36 is a diagram illustrating a conventional technique.

In step S22, the sample is dispensed to the first reaction container 91 (see FIG. 35). Specifically, the control unit 411 operates the sample dispensing unit 212, suctions the sample from the sample container 95, and discharges the suctioned sample to a new first reaction container 91 held in the container table 220.

In step S23, the sample is dispensed to another new first reaction container 91 (see FIG. 35). Specifically, the control unit 411 operates the sample dispensing unit 213 to suction the sample from the dispensed first reaction container 91, and discharges the suctioned sample to a new first reaction held in the container table 220. The first reaction container 91 to which the sample is first dispensed is held in the container table 220 for re-examination until it is confirmed that the measurement result of the sample is generated and re-examination is not to be performed. The first reaction container 91, to which the sample is subsequently dispensed, is transferred to the heating table 250.

In step S24, a sample is prepared by dispensing a reagent into the first reaction container 91 into which the sample is dispensed. The control unit 411 heats the sample in the first reaction container 91 to a predetermined temperature in the heating table 250. The control unit 411 controls the first container transfer unit 270 to transfer the first reaction container 91 to the reagent dispensing position Pe or Pf of the one of the reagent dispensing units 242 and 243 that dispenses the reagent according to the measurement item, and a predetermined amount of reagent is dispensed into the first reaction container 91 by the reagent dispensing unit 242 or 243. In this way a measurement sample is prepared. Note that the control unit 411 performs reagent dispensing by the reagent dispensing unit 242 or 243 and heating process in the heating table 250 a plurality of times depending on measurement items.

In step S25, measurement is performed on the sample in the first reaction container 91. The control unit 411 causes the gripping mechanism 261 to transfer the first reaction container 91 to any of the container holding units 41a of the measuring unit 40. With installation of the first reaction container 91 in the container holding unit 41a, the light from the light transmitting unit 41b is irradiated to the first reaction container 91, and the light receiving unit receives the light transmitted through the measurement sample 41c outputs an electric signal. The electric signal is transmitted to the analysis unit 450 via the control unit 411. The analysis unit 450 analyzes the time-series data according to the measurement item, and records the analysis result in the storage unit.

In step S26, after a predetermined measurement time elapses, the gripping mechanism 261 removes the first reaction container 91 from the container holding unit 41a and transfers and inputs the container 91 to the first disposal port 11a. The first reaction container 91 discharged into the first waste port 11a is conveyed to the disposal unit 50 as waste GB and stored.

Note that the analysis unit 450 determines whether to perform a re-examination according to the analysis result, and generates a re-examination order when performing a re-examination. In step S27, the control unit 411 determines whether a re-examination order is set for the sample.

If a re-examination order is not set, in step S28 the control unit 411 discards the first reaction container 91 (see FIG. 35)

containing the sample for re-examination initially set in the container table 220 in the first disposal port 11*b*. Specifically, the control unit 411 removes the unnecessary first reaction container 91 from the holding hole 221 of the container table 220 by the holding mechanism 262, and transfers the unnecessary first reaction container 91 to the first disposal port 11*b* for introduction. The first reaction container 91 discharged in the first waste port 11*b* is transported to the disposal unit 50 as waste GB and stored therein.

When the re-examination order is set, the control unit 411 returns the process to step S23. In the re-examination, the processes of steps S23 to S26 are performed on the first reaction container 91 containing the sample for re-examination initially set in the container table 220. Note that when the re-examination is carried out, steps S27 and S28 are skipped, and the first reaction container 91 for re-examination is discarded to the first disposal port 11*a* in step S26, whereby the measurement process is completed.

Measurement Process of Second Measurement Unit

Figure 33:
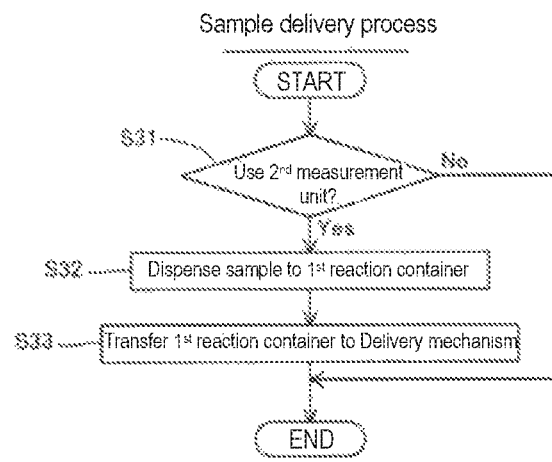
FIG. 33 is a flowchart illustrating a sample delivery process.

When the second measurement unit 20 is to perform the measurement of the sample, the first measurement unit 10 performs a process for delivering the first reaction container 91 containing the sample shown in FIG. 33. The process of FIG. 33 is performed by the control unit 411 of the first measurement unit 10.

In step S31, the control unit 411 determines whether to perform the measurement by the second measurement unit 20. That is, when the measurement order acquired by the analysis unit 450 includes measurement items by the second measurement unit 20, the control unit 411 advances the process to step S32. When the measurement order does not include a measurement item by the second measurement unit 20, the measurement by the second measurement unit 20 is not executed on the sample.

In step S32, the sample is dispensed into the first reaction container 91. Specifically, the control unit 411 operates the sample dispensing unit 212, suctions the sample from the sample container 95, and discharges the suctioned sample to a new first reaction container 91 held in the container table 220. Note that when the measurement order includes both a measurement item by the first measurement unit 10 and a measurement item by the second measurement unit 20, the first reaction container 91 for measurement by the first measurement unit 10 and the second measurement container the first reaction container 91 for delivery to the second measurement unit 20 are prepared separately, and the sample is dispensed (see FIG. 35) to each reaction container.

In step S33, the control unit 411 starts transfer of the delivery-use first reaction container 91 to the delivery mechanism 306 (see FIG. 13). Specifically, the control unit 411 removes the first reaction container 91 for delivery held on the container table 220 by the first container transfer unit 270, and transfers the container to the relay unit 307 of the delivery mechanism 306. The transfer of the first reaction container 91 for delivery is performed in parallel with the measurement operation in the first measurement unit 10.

Figure 34:
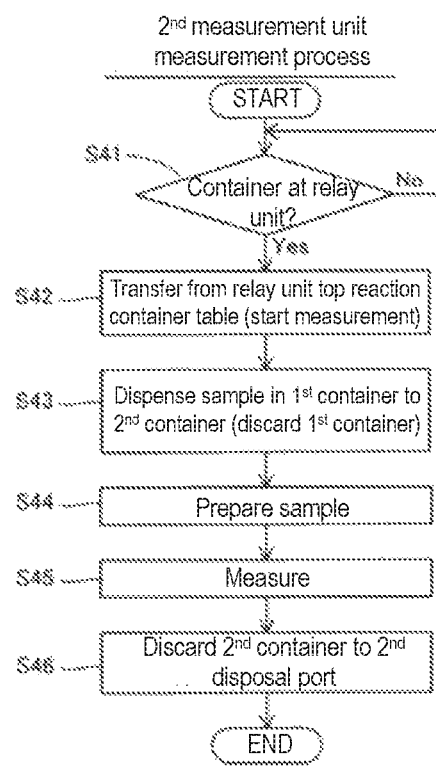
FIG. 34 is a flowchart illustrating a measurement process of the second measurement unit.

FIG. 34 shows a measurement process in the second measurement unit 20. The process of each step shown in FIG. 34 is executed by the control unit 421 of the second measurement unit 20. For each part of the second measurement unit 20, refer to FIG. 14.

In step S41, the control unit 421 determines whether the first reaction container 91 is installed in the relay unit 307 of the delivery mechanism 306 based on the signal from the detection unit 307*b*. When the detection unit 307*b* detects that the first reaction container 91 is installed in the relay unit 307, the process proceeds to step S42.

In step S42, the control unit 421 removes the first reaction container 91 for delivery held in the relay unit 307 by the second container transfer unit 308, and transfers the first reaction container 91 to the delivery table 311. In this way measurement by the second measurement unit 20 is started.

In step S43, the control unit 421 dispenses the sample in the first reaction container 91 into the second reaction container 92. The control unit 421 takes out the first reaction container 91 from the delivery table 311 by the holding mechanism 321 and transfers the container to the sample supply unit 313. The control unit 421 causes the reaction container transfer unit 330 to transfer the second reaction container 92 from the container supply unit 303 to the spotting unit 361. The control unit 421 causes the sample dispensing unit 351 of the dispensing unit 350 to suction the sample in the first reaction container 91 and dispenses it into the second reaction container 92 (see FIG. 35). The subsequent processes are performed on the second reaction container 92. The control unit 421 takes out the first reaction container 91 that has been suctioned from the sample supply unit 313 by the holding mechanism 321 and transfers it to the second disposal port 21 for introduction. In this way the first reaction container 91 is transported into the disposal unit 50 as waste GB.

In step S44, the control unit 421 causes the second reaction container 92 to prepare a sample. That is, the control unit 421 implements the series of processes shown in FIG. 15. The control unit 421 causes the reaction container transfer unit 330 to transfer the second reaction container 92 to the spotting unit 361, dispenses the R1 reagent by the dispensing unit 350, transfers container 92 to the heating unit 370 by the reaction container transfer unit 330 and heats the reaction container 92. The control unit 421 takes out the second reaction container 92 by the reaction container transfer unit 330, dispenses the R2 reagent by the dispensing unit 350, transfers the reaction container 92 to the heating unit 370 by the reaction container transfer unit 330, and heats the reaction container 92. Then, the control unit 421 transfers the second reaction container 92 from the heating unit 370 to the BF separation unit 390 by the reaction container transfer unit 330, and causes the BF separation unit 390 to perform the primary BF separation process.

The control unit 421 takes out the second reaction container 92 from the BF separation unit 390 by the reaction container transfer unit 330, dispenses the R3 reagent using the dispensing unit 350, and heats the second reaction container 92 with the heating unit 370. Then, the control unit 421 transfers the second reaction container 92 from the heating unit 370 to the BF separation unit 390 by the reaction container transfer unit 330, and causes the BF separation unit 390 to perform the secondary BF separation process.

The control unit 421 causes the reaction container transfer unit 330 to transfer the second reaction container 92 to the R4 reagent dispensing unit 381 and dispenses the R4 reagent using the R4 reagent dispensing unit 381. The control unit 421 causes the gripping mechanism 321 to transfer the second reaction container 92 to the R5 reagent dispensing unit 382, and dispenses the R5 reagent using the R5 reagent dispensing unit 382. After dispensing the R5 reagent, the control unit 421 transfers the second reaction container 92 to the heating unit 370 by the reaction container transferring unit 330. The second reaction container 92 is heated in the heating unit 370 for a predetermined time. Thus, a sample is prepared in the second reaction container 92.

In step S45, measurement by the measuring unit 304 is performed. Specifically, the second reaction container 92 is transferred to the measurement unit 304 by the holding mechanism 321. The measuring unit 304 measures the intensity of light generated by causing the substrate to react with the label of the immune complex 105. The detection result of the measurement unit 304 is output to the analysis unit 450 via the control unit 421.

After the measurement is completed, in step S46, the control unit 421 takes out the measured second reaction container 92 from the measurement unit 304 by the holding mechanism 321, and transfers the reaction container 92 to the second disposal port 21, and inputs the container therein. In this way the measured second reaction container 92 is stored in the waste unit 50 as waste GB.

The analysis process operation is performed by the sample measuring system 100 as described above.

Note that the embodiments disclosed in herein are examples in all respects and are not restrictive. The scope of the present invention is indicated not by the description of the above embodiment but by the scope of the claims, and includes meanings equivalent to the claims and all modifications within the scope of the claims.

EXPLANATION OF REFERENCE NUMBERS

10: first measurement unit;
10a: first housing;
11, 11a, 11b: first disposal port;
20: second measurement unit;
20a: second housing;
21: second disposal port;
30: third measurement unit;
41a, 42a: container holding unit;
41b, 43b: light transmitting unit;
41c, 43c: light receiving unit;
42b: detection unit;
43a: flow path;
50: disposal unit;
50a: third housing;
52: disposal box;
54: connection opening;
60: waste input unit;
61: first waste input unit;
62: second waste input unit;
70: waste transport unit;
71: first chute unit;
72: second chute unit;
75: first waste transport unit;
76: second waste transport unit;
77: transport path,
81, 212, 213: sample dispensing unit;
91: first reaction container;
92: second reaction container;
93: pipette tip;
100: sample measuring system;
110: housing;
120: first frame;
130: second frame;
133: concavity;
201, 301, 301a, 301b: reagent storage;
202, 302: sample preparation unit;
203, 303: container supply unit;
270: first container transfer unit;
306: delivery mechanism;
307: relay unit;
308: second container transfer unit;
451: waste information acquiring unit;
452, 452a, 452b: waste sensor;
470: notifying unit;
A1: first area;
A2: second area;
GB: waste;
MU: measurement unit.

What is claimed is:

1. A sample measuring system comprising:
a first measurement unit configured to measure a first sample and a second measurement unit configured to measure a second sample, wherein the first measurement unit occupies a first area of the sample measuring system, and
wherein the second measurement unit occupies a second area of the sample measuring system different from the first area; and
a disposal unit for commonly storing waste generated from the first measurement unit and the second measurement unit;
wherein the first measurement unit includes a first disposal port located within the first area and connected to the disposal unit for discharging the waste generated in the first measurement unit, a first control unit, and at least one first movable waste input unit configured to move the waste generated in the first measurement unit to the first disposal port and input the waste generated in the first measurement unit to the first disposal port, wherein the first control unit is programmed to control the at least one first movable waste input unit to move only within the first area and not within the second area such that the first measurement unit can dispose of waste via the first disposal port independently of the second measurement unit and without interfering with operations of the second measurement unit; and
wherein the second measurement unit includes a second disposal port located within the second area and connected to the disposal unit for discharging the waste generated in the second measuring unit, a second control unit, and at least one second movable waste input unit configured to move the waste generated in the second measurement unit to the second disposal port and input the waste generated in the second measurement unit to the second disposal port, wherein the second control unit is programmed to control the at least one second movable waste input unit to move only within the second area and not within the first area such that the second measurement unit can dispose of waste via the second disposal port independently of the first measurement unit and without interfering with operations of the first measurement unit.

2. The sample measuring system according to claim 1, wherein
the disposal unit accepts the waste containing at least one of a reaction container for preparing at least one of the first sample or the second sample and a pipette tip for dispensing at least one of the first sample or the second sample.

3. The sample measuring system according to claim 1, wherein
the disposal unit accepts the waste that has been in contact with at least one of the first sample or the second sample.

4. The sample measuring system according to claim 1, further comprising:
a waste information acquiring unit that acquires information on the amount of the waste stored in the disposal unit; and a notifying unit that issues notification of information on the amount of the waste acquired by the waste information acquiring unit.

5. The sample measuring system according to claim 4, wherein
the waste information acquiring unit acquires information on the amount of the waste based on the total value of the number of times of execution of a measurement order in each of the first measurement unit and the second measurement unit.

6. The sample measuring system according to claim 4, wherein
the disposal unit comprises a waste sensor for detecting the waste stored in the disposal unit; and
the waste information acquiring unit acquires information on the amount of waste based on a detection signal of the waste sensor.

7. The sample measuring system according to claim 4, wherein
the notifying unit alerts to the fact when the amount of the waste is equal to or greater than a predetermined amount.

8. The sample measuring system according to claim 1, further comprising:
a housing provided with the disposal unit;
wherein the disposal unit comprises a waste box configured to be withdrawn from the housing.

9. The sample measuring system according to claim 8, wherein
the disposal unit has a connection opening for receiving the waste discarded from the second disposal port into the waste box.

10. The sample measuring system according to claim 8, wherein
the disposal unit is provided so as to extend in a depth direction of the housing from a front surface of the housing to a back surface side of the housing.

11. The sample measuring system according to claim 10, wherein
the disposal unit extends in the depth direction to a position of the first disposal port and the second disposal port that is on the back side of the housing.

12. The sample measuring system according to claim 8, wherein
the disposal unit, in a plan view, is arranged at a position on the second measurement unit side from a center within the first measurement unit, or a position on the first measurement unit side from a center within the second measurement unit.

13. The sample measuring system according to claim 12, wherein
the first disposal port is arranged at a position in the first area on the second measurement unit side from a center in the first measurement unit in the plan view; and
the second disposal port is arranged at a position in the second area on the first measurement unit side from a center in the second measurement unit in the plan view.

14. The sample measuring system according to claim 1, further comprising:
a waste transfer unit for transferring the waste discharged from at least one of the first disposal port and the second disposal port to the disposal unit.

15. The sample measuring system according to claim 14, wherein
the waste transfer unit comprises:

a first waste transfer unit that transfers the waste discharged from the first disposal port of the first measurement unit;
a second waste transfer unit that transfers the waste discharged from the second disposal port of the second measurement unit.

16. The sample measuring system according to claim 15, wherein
the first waste transfer unit and the second waste transfer unit are configured to deliver the waste to be transferred to the disposal unit.

17. The sample measuring system according to claim 14 wherein
the waste transfer unit comprises a first chute unit communicating the first disposal port and the disposal unit, and a second chute unit communicating the second disposal port and the disposal unit.

18. The sample measuring system according to claim 1, wherein the first waste input unit is configured to input the waste to the first disposal port irrespective of the operations of the second measurement unit, and wherein the second waste input unit is configured to input the waste to the second disposal port irrespective of the operations of the first measurement unit.

19. The sample measuring system according to claim 1, wherein the first measurement unit is in a first housing and the second measurement unit is in a second housing separate from the first housing.

20. A sample measuring method comprising the steps of:
measuring a first sample in a first measurement unit, wherein the first measurement unit occupies a first area of a sample measuring system;
moving a first movable waste input unit only within the first area and not within a second area of a second measurement unit;
moving, by the first movable waste input unit, a first waste generated by the first measurement unit to a first disposal port provided in the first area for the first measurement unit and introducing the first waste into the first disposal port independently of the second measurement unit and without interfering with operations of the second measurement unit;
measuring a second sample in the second measuring unit, wherein the second measurement unit occupies the second area of the sample measuring system that is different from the first area;
moving a second movable waste input unit only within the second area and not within the first area of the first measurement unit;
moving, by the second movable waste input unit, a second waste generated by the second measurement unit to a second disposal port provided in the second area for the second measurement unit and introducing the second waste into the second disposal port independently of the first measurement unit and without interfering with the operations of the first measurement unit;
storing the waste discharged from the first measurement unit and the waste discharged from the second measurement unit in a disposal unit commonly connected to the first disposal port and the second disposal port.

21. A sample measuring system comprising:
a first measurement unit configured to measure a first sample and a second measurement unit configured to measure a second sample,
wherein the first measurement unit occupies a first area of the sample measuring system, and wherein the second measurement unit occupies a second area of the sample measuring system different from the first area; and wherein the first measurement unit comprises a sample dispensing unit configured to dispense a sample into a first sample container and prepares the first sample from the sample dispensed by the sample dispensing unit;

a delivery mechanism configured to deliver the first sample container including the sample dispensed by the sample dispensing unit from the first area to the second area; and a disposal unit for commonly storing waste generated from the first measurement unit and the second measurement unit;

wherein the second measurement unit is configured to prepare the second sample from the sample included in the first sample container delivered by the delivery mechanism;

wherein the first measurement unit includes a first disposal port located within the first area and connected to the disposal unit for discharging the waste generated in the first measurement unit such that the first measurement unit can dispose of waste via the first disposal port independently of the second measurement unit and without interfering with operations of the second measurement unit; and wherein the second measurement unit includes a second disposal port located within the second area and connected to the disposal unit for discharging the waste generated in the second measuring unit such that the second measurement unit can dispose of waste via the second disposal port independently of the first measurement unit and without interfering with operations of the first measurement unit.

22. The sample measuring system according to claim 21, wherein
the first measurement unit includes a first control unit, and at least one first movable waste input unit configured to move the waste generated in the first measurement unit to the first disposal port and input the waste generated in the first measurement unit to the first disposal port, wherein the first control unit is programmed to control the at least one first movable waste input unit to move only within the first area; and wherein the second measurement unit includes a second control unit, and at least one second movable waste input unit configured to move the waste generated in the second measurement unit to the second disposal port and input the waste generated in the second measurement unit to the second disposal port, wherein the second control unit is programmed to control the at least one second movable waste input unit to move only within the second area.

23. A sample measuring method comprising the steps of:
dispensing a sample into a first sample container in a first measurement unit, wherein the first measurement unit occupies a first area of a sample measuring system;

preparing a first sample from the sample dispensed into the first sample container in the first measurement unit;

measuring the first sample in the first measurement unit;

introducing a waste generated by the first measurement unit into a first disposal port provided in the first area for the first measurement unit independently of a second measurement unit and without interfering with operations of the second measurement unit;

delivering the first sample container including the dispensed sample from the first area to a second area, wherein the second measurement unit occupies the second area of the sample measuring system that is different from the first area;

preparing, in the second measurement unit, a second sample from the sample in the first sample container delivered from the first area;

measuring the second sample in the second measuring unit;

introducing a waste generated by the second measurement unit into a second disposal port provided in the second area for the second measurement unit independently of the first measurement unit and without interfering with the operations of the first measurement unit;

storing the waste discharged from the first measurement unit and the waste discharged from the second measurement unit in a disposal unit commonly connected to the first disposal port and the second disposal port.

24. The sample measuring method according to claim 23, wherein the introducing the waste generated by the first measurement unit into the first disposal port further comprises:
moving a first movable waste input unit only within the first area; and moving, by the first movable waste input unit, the waste generated by the first measurement unit to the first disposal port; and wherein the introducing the waste generated by the second measurement unit into the second disposal port further comprises:
moving a second movable waste input unit only within the second area; and moving, by the second movable waste input unit, the waste generated by the second measurement unit to the second disposal port.

* * * * *